(12) United States Patent  
Narikawa

(10) Patent No.: US 10,296,009 B2
(45) Date of Patent: May 21, 2019

(54) AUTONOMOUS MOVEMENT DEVICE, AUTONOMOUS MOVEMENT METHOD AND NON-TRANSITORY RECORDING MEDIUM

(71) Applicant: CASIO COMPUTER CO., LTD., Shibuya-ku, Tokyo (JP)

(72) Inventor: Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/269,917

(22) Filed: Sep. 19, 2016

(65) Prior Publication Data

US 2017/0176997 A1    Jun. 22, 2017

(30) Foreign Application Priority Data

Dec. 16, 2015  (JP) .................................. 2015-245196

(51) Int. Cl.
*G05D 1/00* (2006.01)
*G05D 1/02* (2006.01)
(Continued)

(52) U.S. Cl.
CPC ......... *G05D 1/0246* (2013.01); *G05D 1/0088* (2013.01); *G05D 1/0274* (2013.01);
(Continued)

(58) Field of Classification Search
CPC .. G05D 1/0246; G05D 1/0088; G05D 1/0274; G05D 2201/0203; G06T 7/73; G06T 2207/30252
See application file for complete search history.

(56) References Cited

U.S. PATENT DOCUMENTS 5,378,969 A  1/1995 Haikawa et al.
6,466,866 B1  10/2002 Sato
(Continued)

FOREIGN PATENT DOCUMENTS

CN  104723338 A  6/2015
JP  05297940 A  11/1993
(Continued)

OTHER PUBLICATIONS

Benavidez P, Muppidi M, Rad P, Prevost JJ, Jamshidi M, Brown L. Cloud-based realtime robotic visual slam. InSystems Conference (SysCon), 2015 9th Annual IEEE International Apr. 13, 2015 (pp. 773-777). IEEE. (Year: 2015).*

(Continued)

*Primary Examiner* — Alan D Hutchinson
(74) *Attorney, Agent, or Firm* — Holtz, Holtz & Volek PC

(57) ABSTRACT

To quickly recover from a status in which a local device position estimation is unavailable. A movement processor of an autonomous movement device executes a drive process for a driver so as to move autonomously. A position estimator estimates the local device position. An estimation determiner determines whether or not the estimation result of the local device position by the position estimator is uniquely defined. A movement process controller controls the movement processor so as to move to a position where the estimation result of the local device position by the position estimator is uniquely defined when the estimation determiner determines that the estimation result is not defined uniquely.

20 Claims, 11 Drawing Sheets

(51) Int. Cl.
*G06T 7/00* (2017.01)
*G06T 7/73* (2017.01)

(52) U.S. Cl.
CPC ....... *G06T 7/73* (2017.01); *G05D 2201/0203* (2013.01); *G06T 2207/30252* (2013.01)

(56) References Cited

U.S. PATENT DOCUMENTS

| | | | |
|---|---|---|---|
| 9,714,841 | B2 | 7/2017 | Toda et al. |
| 9,739,215 | B2 | 8/2017 | Martin et al. |
| 9,773,335 | B2 | 9/2017 | Koga |
| 2009/0028387 | A1 | 1/2009 | Jeong et al. |
| 2009/0096686 | A1* | 4/2009 | Niculescu ............. H01Q 1/246 343/703 |
| 2009/0254236 | A1 | 10/2009 | Peters |
| 2010/0145550 | A1 | 6/2010 | Ross-Martin |
| 2011/0044504 | A1 | 2/2011 | Oi et al. |
| 2011/0054689 | A1 | 3/2011 | Nielsen et al. |
| 2011/0106450 | A1 | 5/2011 | Toda et al. |
| 2012/0188237 | A1 | 7/2012 | Han et al. |
| 2012/0230550 | A1* | 9/2012 | Kraut ..................... G05D 1/024 382/113 |
| 2012/0239191 | A1 | 9/2012 | Versteeg et al. |
| 2013/0103405 | A1 | 4/2013 | Namba et al. |
| 2013/0138246 | A1* | 5/2013 | Gutmann ............. G05D 1/0231 700/253 |
| 2014/0031980 | A1 | 1/2014 | Gutmann et al. |
| 2014/0225919 | A1 | 8/2014 | Kaino et al. |
| 2014/0350839 | A1 | 11/2014 | Pack et al. |
| 2015/0262361 | A1 | 9/2015 | Lo et al. |
| 2016/0089783 | A1 | 3/2016 | Noh et al. |
| 2016/0147230 | A1* | 5/2016 | Munich ................ G05D 1/0246 701/28 |
| 2016/0180533 | A1 | 6/2016 | Pavani et al. |
| 2016/0334885 | A1 | 11/2016 | Togawa et al. |
| 2017/0098375 | A1 | 4/2017 | Smart |
| 2017/0148167 | A1 | 5/2017 | Aratani |
| 2017/0164447 | A1 | 6/2017 | Rogers et al. |
| 2017/0174227 | A1 | 6/2017 | Tatourian et al. |
| 2017/0178331 | A1 | 6/2017 | Narikawa |

FOREIGN PATENT DOCUMENTS

| | | |
|---|---|---|
| JP | 2004005593 A | 1/2004 |
| JP | 2004276168 A | 10/2004 |
| JP | 2008059218 A | 3/2008 |
| JP | 2008071352 A | 3/2008 |
| JP | 2008090575 A | 4/2008 |
| JP | 2009169845 A | 7/2009 |
| JP | 2009193240 A | 8/2009 |
| JP | 2010288112 A | 12/2010 |
| JP | 2011048706 A | 3/2011 |
| JP | 2012089174 A | 5/2012 |
| JP | 2012216051 A | 11/2012 |
| JP | 2014186694 A | 10/2014 |
| JP | 2015146091 A | 8/2015 |

OTHER PUBLICATIONS

Related U.S. Appl. No. 15/359,689, filed Nov. 23, 2016, First Named Inventor: Yasushi Maeno, Title: "Autonomous Movement Device, Autonomous Movement Method, and Non-Transitory Recording Medium".

Tomokazu Sato, "Sequential Three-dimensional Reproduction from Motion Image by Feature Point Tracking, and Application Thereof, from Basics of Coordinate System to Application Case Examples and Recent Research Tendency", Image Sensing Symposium Tutorial.

Andrew J. Davison, "Real-Time Simultaneous Localisation and Mapping with a Single Camera", Proceedings of the 9th IEEE International Conference on Computer Vision vol. 2, 2003, pp. 1403-1410.

Richard Hartley, et al., "Multiple View Geometry in Computer Vision", Second Edition, Mar. 2004.

Related U.S. Appl. No. 15/278,627, filed Sep. 28, 2016, First Named Inventor: Tetsuro Narikawa, Title: "Autonomous Movement Device, Autonomous Movement Method and Non-Transitory Recording Medium".

Related U.S. Appl. No. 15/276,320, filed Sep. 26, 2016, First Named Inventor: Mitsuyasu Vakajima, Title: "Autonomous Movement Device, Autonomous Movement Method and Non-Transitory Recording Medium".

Japanese Office Action dated Apr. 4, 2017 issued in related Japanese Application No. 2016-049350.

Japanese Office Action (and English translation thereof) dated Oct. 17, 2017, issued in counterpart Japanese Application No. 2015-245196.

Oezuysal, et al., "Fast Keypoint Recognition using Random Ferns", https://cvlab.epfl.ch/files/content/sites/cvlab2/files/publications/publications/2010/OzuysalCLF10.pdf (Year: 2010).

Riisgaard, et al., "SLAM for Dummies", As accessed by the WayBackMachine.org, (first published on Nov. 8, 2010).

Chinese Office Action (and English language translation thereof) dated Feb. 11, 2019 issued in counterpart Chinese Application No. 201611033504.9.

* cited by examiner

AUTONOMOUS MOVEMENT DEVICE, AUTONOMOUS MOVEMENT METHOD AND NON-TRANSITORY RECORDING MEDIUM

CROSS-REFERENCE TO RELATED APPLICATION

This application claims the benefit of Japanese Patent Application No. 2015-245196, filed on Dec. 16, 2015, the entire disclosure of which is incorporated by reference herein.

FIELD

This application relates generally to an autonomous movement device, an autonomous movement method, and a non-transitory recording medium.

BACKGROUND

Autonomous movement devices that autonomously move in accordance with an application are becoming popular. For example, autonomous movement devices that autonomously move for the purpose of indoor space cleaning are known. In general, as for such autonomous movement devices, creation of a map in an actual space and estimation of the local device position in the real space are necessary.

As for the scheme of creating a map in the actual space, for example, a Simultaneous Localization And Mapping (SLAM) scheme has been known. The basic principle of the SLAM technology using a monocular camera is disclosed in Non Patent Literature 1, and by tracking the same feature point from the multiple frames of a motion image picked up by the camera, a process of alternately estimating the three-dimensional position of the local device (camera position) and the three-dimensional position of the feature point (this is collected up to form map information) is executed. In addition, there is an autonomous movement device that creates an environmental map in the actual space to perform autonomous movement (see, for example, Patent Literature, 1, 2).

Non Patent Literature 1 Andrew J. Davison, "Real-Time Simultaneous Localization and Mapping with a Single Camera", Proceedings of the 9th IEEE International Conference on Computer Vision Volume 2, 2003, pp. 1403-1410

Non Patent Literature 2 Richard Hartley, Andrew Zisserman, "Multiple View Geometry in Computer Vision", Second Edition, Cambridge University Press, March 2004, chapter 9

Patent Literature 1 Unexamined Japanese Patent Application Kokai Publication No. 2015-146091

Patent Literature 2 Unexamined Japanese Patent Application Kokai Publication No. 2014-186694

SUMMARY

The autonomous movement device of the present disclosure includes:
an image picker;
an image memory;
a controller; and
a driver,
wherein
the image memory stores information on a plurality of images picked up by the image picker, and
the controller:
executes a drive process for the driver so as to move autonomously based on information on an image picked up by the image picker;
estimates a local device position using the information on the plurality of images stored in the image memory;
determines whether or not an estimation result of the local device position is uniquely defined; and
controls the drive process so as to move to a position where the estimation result of the local device position is uniquely defined upon determination that the estimation result is not uniquely defined.

BRIEF DESCRIPTION OF THE DRAWINGS

A more complete understanding of this application can be obtained when the following detailed description is considered in conjunction with the following drawings, in which.

DETAILED DESCRIPTION

Figure 1:
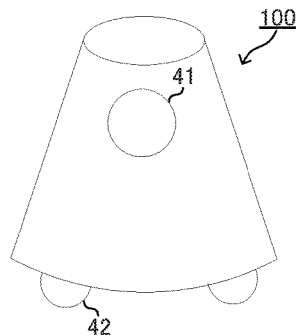
FIG. 1 is a diagram illustrating an external appearance of an autonomous movement device according to an embodiment.

An explanation will be given of an autonomous movement device according to an embodiment of the present disclosure. An autonomous movement device 100 autonomously moves in accordance with an application. Example applications are security and monitoring, indoor cleaning, pet up-keeping, and plaything.

The autonomous movement device 100 includes, as an external appearance, an image picker 41 and a driver 42.

The image picker 41 includes a monocular imaging device (camera). The image picker 41 obtains an image (frame) at, for example, 30 fps. The autonomous movement device 100 performs autonomous movement while recognizing the local device position and the surrounding environment in a real-time manner based on the images sequentially obtained by the image picker 41.

The driver 42 is a mover which is an independent two-wheel drive type, and which includes wheels and a motor. The autonomous movement device 100 is capable of parallel movement (translation movement) in the back-and-forth direction by the two wheels driven in the same direction, of rotating (direction change) at the present location by the two wheels driven in the opposite directions, and of turning (translation movement+rotation (direction change) movement) by the two wheels driven at respective speeds changed differently. In addition, each wheel is provided with a rotary encoder which measures the number of rotations of the wheel, and is capable of calculating a translation movement amount and a rotation amount by utilizing a geometric relationship, such as the diameter of the wheel, the distance between the wheels, and the like. When, for example, the diameter of the wheel is D, and the number of rotations is R (which is measured by the rotary encoder), the translation movement amount of this wheel at the floor contacting part can be defined as $\pi \times D \times R$. In addition, when the diameter of the wheel is D, the distance between the wheels is I, the number of rotations by the right wheel is $R_R$, and the number of rotations by the left wheel is $R_L$, the rotation amount for direction change can be defined as (when a clockwise rotation is defined as a positive rotation) $360 \text{ degrees} \times D \times (R_L - R_R)/(2 \times I)$. By accumulating those translation movement amount and rotation amount in sequence, the driver 42 functions as a so-called odometry which is capable of measuring the local device position (the position and the direction with reference to the position and the direction at the start of movement).

The precision of the local device position obtained from the odometry and that of the direction therefrom are often reduced due to the friction of the wheel, a slip, and the like. In particular, since the error is being accumulated, the precision decreases as time advances. However, as for the rotation component (the direction information) from the odometry, the precision can be improved using angular speed sensor information to be explained later. In addition, by utilizing an unillustrated direction sensor which detects an earth magnetism and which specifies the direction, absolute direction information utilizing the earth magnetism is obtainable regardless of the obtained value from the odometry.

Note that crawlers may be applied instead of the wheels, and a movement may be made by multiple (for example, two) walking legs. In those cases, like the case of the wheels, the local device position and the direction are measurable based on the movement of the two crawlers and that of the legs.

Figure 2:
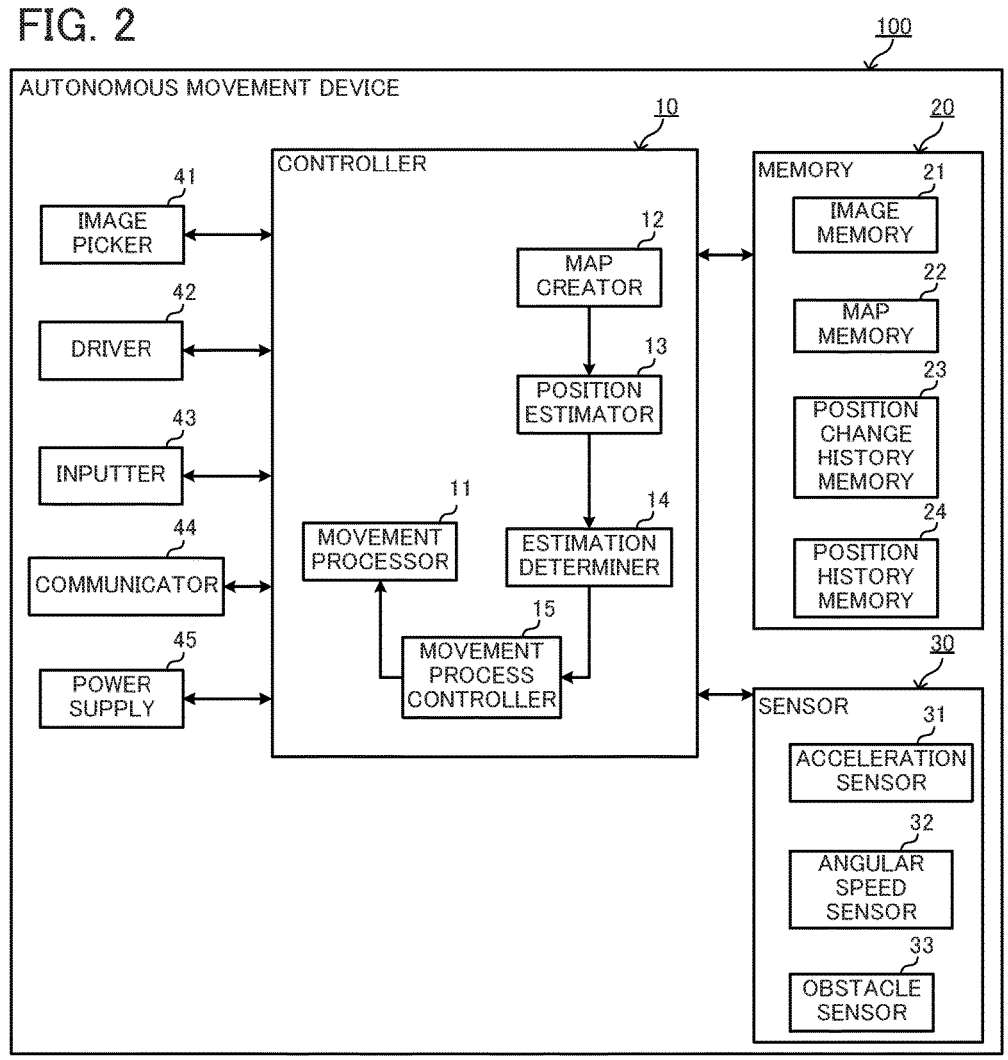
FIG. 2 is a diagram illustrating a structure of the autonomous movement device according to the embodiment.

As illustrated in FIG. 2, the autonomous movement device 100 includes, in addition to the image picker 41 and the driver 42, a controller 10, a memory 20, a sensor 30, an inputter 43, a communicator 44, and a power supply 45.

The controller 10 includes a Central Processing Unit (CPU) and the like, executes a program stored in the memory 20, thereby accomplishing the functions of respective components (a movement processor 11, a map creator 12, a position estimator 13, an estimation determiner 14, and a movement process controller 15) to be explained later.

The memory 20 includes a Read Only Memory (ROM), a Random Access Memory (RAM), and the like, and includes an image memory 21, a map memory 22, a position change history memory 23, and a position history memory 24. The ROM stores programs (for example, programs relating to calculation by an SLAM scheme to be explained later and autonomous movement control process) to be executed by the CPU of the controller 10, and necessary data in order to execute the programs. The RAM stores data to be created and changed during the execution of the programs.

The image memory 21 stores images picked up by the image picker 41. However, in order to save the memory capacity efficiently, only some of the picked up images may be stored, or a feature quantity of the image may be stored instead of the image itself. As for the important image (a key frame to be explained later), information on the local device position (the position of the local device and the direction thereof) when the image is picked up together with information on the image.

The map memory 22 stores a map (information on the three-dimensional position of a feature point and that of an obstacle) created by the map creator 12 based on the SLAM scheme to be explained later and information from an obstacle sensor 33.

The position change history memory 23 stores a history of the change amount of the local device position changed by the movement processor 11.

The position history memory 24 stores a history of the estimated local device position by the position estimator 13.

The sensor 30 includes an acceleration sensor 31, an angular speed sensor 32, and the obstacle sensor 33. The acceleration sensor 31 measures the acceleration in the XYZ (three axes) directions. By performing time integration on the measured values, the velocity in each direction that is X, Y, or Z is obtainable, and by performing time integration on those velocities, a change amount (a moved distance) of the position in each direction that is X, Y, or Z is also obtainable (however, since the sensor values are integrated twice, the accumulated error becomes quite large).

The angular speed sensor 32 measures the angular speed (angular movement amount per a unit time). There is a known fact that obtainment of the direction using the angular speed sensor 32 improves the precision more than obtainment of the direction based on the number of rotations by the wheel. The obstacle sensor 33 detects an obstacle while the autonomous movement device 100 is moving, and is, for example, an infrared sensor or an ultrasound sensor. Note that the obstacle may be detected using the image picker 41 instead of applying the individual obstacle sensor 33. In addition, an unillustrated bumper sensor that detects a collision with other objects may be applied. Still further, an unillustrated direction sensor which detects an earth magnetism and which specifies the direction may be provided. Application of the direction sensor enables an obtainment of the information on the absolute direction utilizing the earth magnetism regardless of the obtained value from the odometry.

Operation buttons that are the inputter 43 to operate the autonomous movement device 100 are provided. The operation buttons include, for example, a power button, a mode change button (to change the modes, such as a cleaning mode and a pet mode), and an initialize button (to start over map creation). As the inputter 43, an unillustrated microphone to input sound, and a sound recognizer that recognizes the speech operation instruction to the autonomous movement device 100 may be provided.

The communicator 44 is a module for a communication with an external device, and is a wireless module including an antenna when a wireless communication with the external device is performed. An example communicator 44 is a wireless module for a short-range wireless communication based on the Bluetooth (Recorded Trademark). The communicator 44 exchanges data between the autonomous movement device 100 and the external device.

The power supply 45 is a source of power to actuate the autonomous movement device 100, and in general, is built-in rechargeable batteries, but may be solar batteries or a system to which power is wirelessly supplied from the floor surface. When the power supply 45 is rechargeable batteries, charging is performed by a charging station (home base) with which the autonomous movement device 100 is docked.

Next, functions of the controller 10 will be explained. The controller 10 includes the movement processor 11, the map creator 12, the position estimator 13, the estimation determiner 14, and the movement process controller 15, and performs an arithmetic operation in accordance with an SLAM scheme to be explained later, instructs the autonomous movement device 100 to move, and the like. In addition, the controller 10 is compatible with a multi-thread function, and is capable of simultaneously executing multiple threads (different process flows).

The movement processor 11 executes a process of actuating the driver 42 to move the local device.

The map creator 12 stores, in the map memory 22 as map information, a three-dimensional position (Map point) of a feature point estimated by the SLAM scheme based on information on the image stored in the image memory 21 and information on the local device position and the direction when the image is picked up, and a three-dimensional position of an obstacle obtained based on information on the local device position and the direction when the obstacle sensor 33 detects the obstacle.

The position estimator 13 estimates, as a visual odometry, the local device position and the direction based on the SLAM scheme to be explained later.

The estimation determiner 14 determines whether or not the position estimator 13 is capable of estimating the local device position based on the presently obtained information. More specifically, when the necessary information for estimating the local device position has been obtained and the estimation result of the local device position based on such information is uniquely defined, the estimation determiner 14 determines that the estimation is possible. Conversely, when the necessary information for estimating the local device position has not been obtained yet or when the estimation result of the local device position based on information is uncertain (for example, multiple estimation candidates are created) although the necessary information has been obtained, the estimation determiner 14 determines that the estimation is unavailable.

The movement process controller 15 controls the movement processor 11 so as to perform an autonomous movement to a position where the local device position is estimatable when the estimation determiner 14 determines that the estimation is unavailable.

Figure 3:
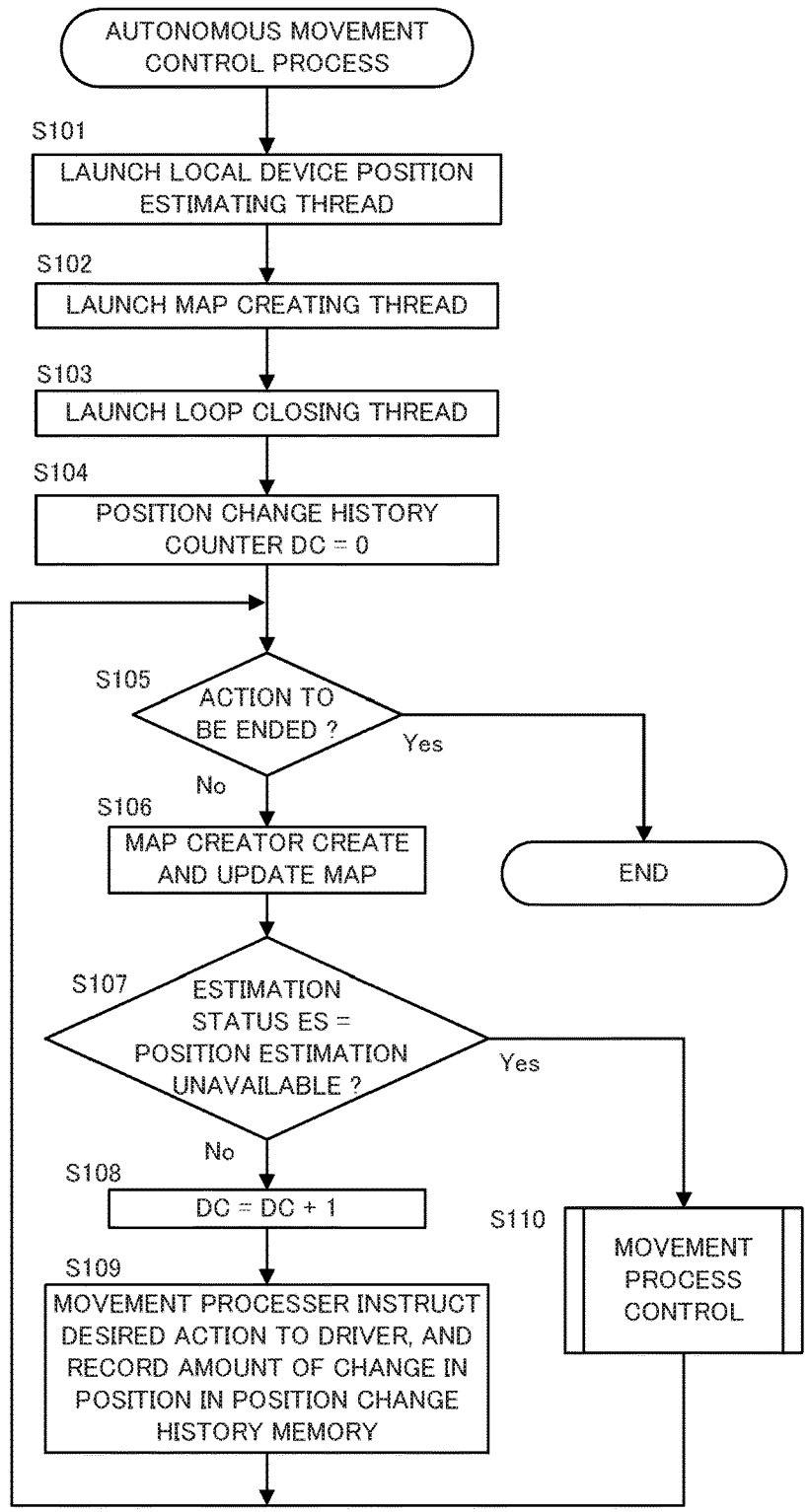
FIG. 3 is a flowchart for an entire autonomous movement control process according to the embodiment.

FIG. 3 is a main flow of the autonomous movement device 100. The controller 10 launches respective threads which are a local device position estimating thread (step S101), a map creating thread (step S102), and a loop closing thread (step S103). By launching the local device position estimating thread and the map creating thread, a creation of the map information and that of a visual odometry (information on the estimated local device position based on the map and the image) through the SLAM scheme start. Next, the controller 10 clears out (step S104) a position-change history counter DC (a variable indicating the number of recorded position change histories in the position change history memory 23) to 0. Subsequently, the controller 10 determines (step S105) whether or not to end the action, when the action is to be ended (step S105: YES), the controller 10 ends the action, and when the action is not to be ended (step S105: NO), the map creator 12 creates and updates the map information (step S106).

Next, the controller 10 determines (step S107) whether or not the value of an estimation status variable ES (a variable indicating whether or not the position estimation is possible) indicates "position estimation unavailable". When the value of the estimation status variable ES indicates "position estimation unavailable" (step S107: YES), the controller 10 executes (step S110) a process that is a "movement process control" to autonomously move to the position where the position is estimatable, and returns the process to the step S105. This "movement process control" realizes a feature function of this embodiment, and the detail thereof will be explained later.

When the value of the estimation status variable ES does not indicate "position estimation unavailable" (step S107: NO), the controller 10 increments (step S108) the position-change history counter DC, the movement processor 11 instructs a desired action to the driver 42, records (step S109) an amount of change in position inherent to this action in a DC-th field in the position change history memory 23 together with a time stamp (for example, a present clock time which can be compared with the time stamp of the position history memory 24), and returns the process to the step S105. In the recording process of the amount of change in position in this step S109, the movement processor 11 corresponds to a position-change-history recorder.

In this case, the amount of change in position is an amount of change from the position before the movement processor 11 instructs the driver 42 in the step S109 and to the position after the driver 42 is actuated in accordance with the instruction and the autonomous movement device 100 moves (by what corresponds to a single action in the movement process in the step S109). This amount of change may be obtained using odometry information, or may be obtained based on the values from the acceleration sensor 31 and the angular speed sensor 32. In general, when the odometry information is utilized, the precise amount of change in position is obtainable, but when, for example, the autonomous movement device 100 is moved by a hand of a person, the odometry information is not useful (in this case, however, the values from the acceleration sensor 31 and the angular speed sensor 32 are still useful). Hence, by utilizing both the odometry information and the sensor information, an error in odometry information originating from factors such that the wheel slips and the autonomous movement device 100 is moved by the hand of a person is desirably compensated by the sensor information.

As a typical example, first, when the power supply 45 is activated with the autonomous movement device 100 being located at the charging station, the autonomous movement device 100 moves each room of a housing entirely with the aid of the obstacle sensor 33, specifies the position of an obstacle like a wall by the obstacle sensor 33, and creates the map information containing the position of the obstacle. When the map is created to some level, an area which has the map information not created yet but which can be estimated as a movable area for the autonomous movement device 100 becomes apparent. Hence, the autonomous movement device 100 may autonomously move to this area to create the map of a further wide range. Next, when map information on substantially all movable ranges for the autonomous movement device 100 is created, the autonomous movement device 100 is enabled to efficiently move based on the map information. For example, the autonomous movement device 100 becomes able to return to the charging station with the shortest route from any position in any room, and to clean the room efficiently.

Figure 4:
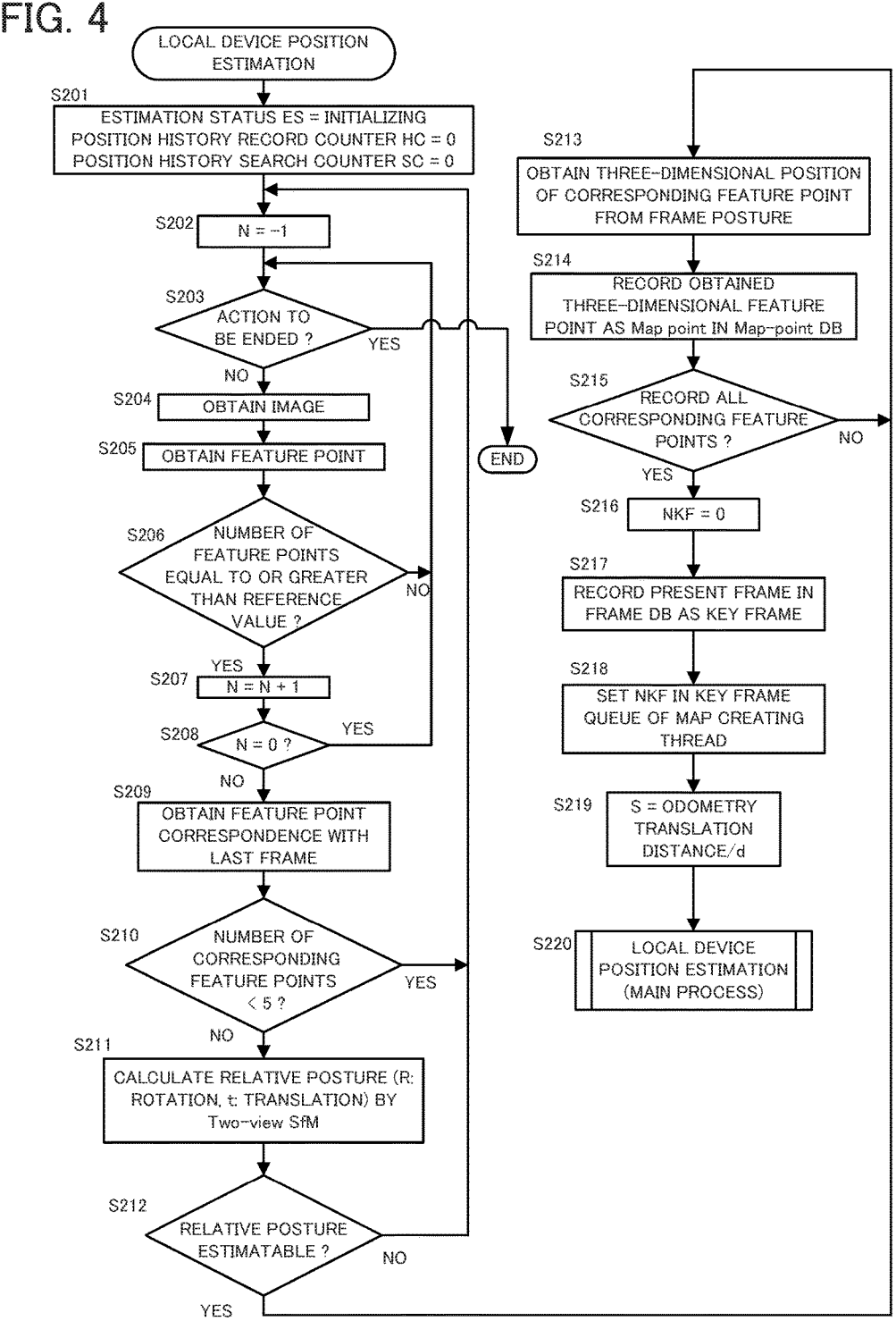
FIG. 4 is a flowchart for an initializing process in a local device position estimating thread of the autonomous movement control process according to the embodiment.

The local device position estimating thread launched in the step S101 in the main flow (see FIG. 3) for the autonomous movement device 100 will be explained with reference to FIGS. 4, 5. This thread is a process of causing the position estimator 13 to execute an initializing process at first in accordance with FIG. 4, and then continuing the local device position estimation (the local device position is estimated by the visual odometry using the image obtained by the image picker 41) in accordance with FIG. 5.

First, the initializing process for the local device position estimating thread will be explained with reference to FIG. 4. The position estimator 13 sets the estimation status variable ES to "initialization in progress", and clears out a position history record counter HC (a variable indicating the number of recorded position histories in the position history memory 24) and a position history search counter SC (a variable utilized to obtain the position history from the position history memory 24) (step S201). Next, the position estimator 13 sets (step S202) a frame counter N (a variable indicating the number of obtained images by the image picker 41) to −1. Subsequently, the position estimator 13 determines (step S203) whether or not to end the action. When the action is to be ended (step S203: YES), the action is ended, and when the action is not to be ended (step S203: NO), the image picker 41 picks up (step S204) an image. The image can be obtained at, for example, 30 fps (the obtained image is also referred to as a frame).

Next, a two-dimensional feature point is obtained (step S205) from the obtained image. The two-dimensional feature point is a portion which has a feature in the image, such as an edge within the image, and is obtainable by algorithms, such as a Scale-Invariant Future Transform (SIFT) and a Speed-Up Robust Features (SURF). Note that other algorithms are also applicable to obtain the two-dimensional feature point.

When the number of obtained two-dimensional feature points is small, a calculation based on a Two-view Structure from Motion scheme to be explained later is not executable, and thus the position estimator 13 compares, in step S206, the number of obtained two-dimensional feature points with a reference value (for example, 10). When the number of obtained two-dimensional feature points is less than the reference value (step S206: NO), the position estimator 13 returns the process to the step S203, and the obtainment of the image and the obtainment of the two-dimensional feature point are repeated until the number of obtained two-dimensional feature points becomes equal to or greater than the reference value. At this stage, although the map information has not been created yet, for example, in the above-explained typical case, the autonomous movement device 100 has started moving each rooms of the housing entirely with the aid of the obstacle sensor 33. Accordingly, when the obtainment of the image and the obtainment of two-dimensional feature point are repeated in this initializing process, the image obtainment is repeated while the autonomous movement device 100 is moving. Hence, various images are obtainable, and image obtainment with a large number of two-dimensional feature points in future is expected.

When the number of obtained two-dimensional feature points is equal to or greater than the reference value (step S206: YES), the position estimator 13 increments (step S207) the frame counter N. Next, the position estimator 13 determines (step S208) whether or not the frame counter N is zero. When the frame counter N is zero (step S208: YES), this means that only a single image has been obtained, and thus the position estimator 13 returns the process to the step S203 in order to obtain the second image. Although not illustrated in the flowchart that is FIG. 4, when the local device position at the time of the obtainment of the first image and the local device position at the time of the obtainment of the second image are apart from each other to some level, the precision for a posture estimation in the subsequent process improves. Hence, when the process returns from the step S208 to the step S203, a stand-by process until the translation distance by the odometry in accordance with an action instruction to the driver 42 in the step S109 in the main flow (see FIG. 3) becomes equal to or greater than a predetermined distance (for example, 1 m) may be added.

When the frame counter N is not zero (step S208: NO), this indicates that the two images have been already obtained, and the position estimator 13 obtains (step S209) the correspondence of the two-dimensional feature point between the two images (the consistent point in the actual environment is present in the respective images, and the correspondence is obtainable). When the number of corresponding feature points is less than five, the posture estimation between the two images to be explained later is not executable, and thus the estimation determiner 14 determines (step S210) whether or not the number of corresponding feature points is less than five. When the number of corresponding feature points is less than five (step S210: YES), in order to start over the obtainment of the initial image, the process returns to the step S202. When the number of corresponding feature points is equal to or greater than five (step S210: NO), the posture between the two images (the difference between the positions where the respective images are obtained (translation vector t) and the difference in directions (rotation matrix R)) are estimatable (step S211) by the Two-view Structure from Motion scheme.

As for this estimation, more specifically, a basic matrix E is obtained from the corresponding feature points, and the basic matrix E is decomposed into the translation vector t and the rotation matrix R to obtain the estimation, but the details are disclosed in Non Patent Literature 2. Hence, the detailed explanation will be omitted in this specification. The value of each element in the translation vector t to be obtained in this case (when a movement in the three-dimensional space is expected, with the position where the first image is obtained being as an origin, three elements that are X, Y, Z are present) differs from the value in the actual environment (according to the Two-view Structure from Motion scheme, the value in the actual environment itself is not obtainable, and a value in a similar space to the actual environment is to be obtained). Hence, such a value is considered as the value in the SLAM space, and the following explanation will be given with reference to the coordinates in the SLAM space (SLAM coordinate system).

When the number of corresponding feature points is equal to or greater than five, the estimation value for the posture between the two images is not defined uniquely in some cases (for example, the condition is insufficient and the estimation value is not defined uniquely, the probable estimation value is not defined uniquely and becomes several candidates even a unique definition through the least square scheme is attempted). When the position estimator 13 estimates the posture (a difference (translation vector t) between the positions where the respective images are picked up, and a difference (rotational matrix R) in direction) between the two images, and when the estimation value is defined uniquely, the estimation determiner 14 determines that the estimation is possible, and when the estimation value is not defined uniquely, the estimation determiner 14 determines that the estimation is unavailable (step S212).

When the estimation determiner 14 determines that the estimation is unavailable (step S212: NO), the process is returned to the step S202, and is started over from the initial image obtainment. When the estimation determiner 14 determines that the estimation is possible (step S212: YES), since the posture (the translation vector t and the rotational matrix R) between the two image is obtained, the process progresses to step S213.

When the posture (the translation vector t and the rotation matrix R) between the two images is obtained, the value thereof indicates the posture of the second image (the local device position (translation vector t) and the direction (rotation matrix R) when the second image is obtained) with reference to the first image (the position where the first image is obtained is defined as the origin of the SLAM coordinate system, the translation vector is zero vector, and the rotation matrix is a unit matrix I). In this case, when the postures of the respective two images (the local device position (translation vector t) and the direction (rotation matrix R) when the image (frame) is obtained, also referred to as a frame posture) have been obtained, the map creator 12 obtains (step S212) a three-dimensional position in the SLAM coordinate system of the two-dimensional feature point (corresponding feature point) that has the correspondence between those images based on the following attitude.

When the coordinates (frame coordinates, already known) of the two-dimensional feature point in the image are (u, v), and the three-dimensional position (unknown) of such a two-dimensional feature point in the SLAM coordinate system is (X, Y, Z), the relationship when those are expressed by the homogeneous coordinates can be expressed as the following formula (1) using a perspective projection matrix P. In this case, the symbol [~] means "equal except a constant multiplication other than zero" (that is, equal or multiple by a constant number (not zero)), and the symbol ['] means "transposition".

$$(uv1)' \sim P(XYZ1)' \qquad (1)$$

In the above formula (1), P is a matrix of three by four, and can be expressed as the following formula (2) by a three-by-three matrix A and external parameters R and t indicating the posture of the image (the frame posture). In this case, (R|t) represents a matrix that arranges the translation column vector t at the right side of the rotation matrix R.

$$P = A(R|t) \qquad (2)$$

In the above formula (2), R and t are obtained as the frame posture as explained above. In addition, since an internal parameter A of the camera is defined by the focal point distance and the imaging element size, thus becoming a constant number when the image picker 41 has been chosen beforehand.

When one of the two-dimensional feature points that have the correspondence between the two images is present at frame coordinates $(u_1, v_1)$ in the first image and at frame coordinates $(u_2, v_2)$ in the second image, the following formula (3) and formula (4) are satisfied. In this case, I is a unit matrix, 0 is a zero vector, and (L|r) is a matrix that arranges the column vector r at the right side of the matrix L.

$$(u_1 v_1 1)' \sim A(I|0)(XYZ1)' \qquad (3)$$

$$(u_2 v_2 1)' \sim A(R|t)(XYZ1)' \qquad (4)$$

In the above formula (3) and formula (4), since a formula can be made for each of $u_1$, $v_1$, $u_2$, and $v_2$, four formulae can be made, but since unknown values are three that are X, Y, and Z, those unknown values X, Y, and Z can be obtained, and those represent the three-dimensional position of the two-dimensional feature point in the SLAM coordinate system. Note that since the number of formulae is greater than the number of unknown values, for example, X, Y, and Z obtained based on $u_1$, $v_1$, $u_2$ may differ from X, Y, and Z obtained based on $u_1$, $v_1$, $v_2$. According to such a case, a simultaneous linear equation under an excessive condition is established, and in general, there is no solution, but the map creator 12 applies the least square scheme to obtain (step S213) most probable X, Y, and Z.

When the three-dimensional position (X, Y, Z) of the two-dimensional feature point in the SLAM coordinate system is obtained, the map creator 12 records (step S214) this position as a Map point in a Map-point database (also referred to as a Map-point DB (DataBase), stored in the map memory 22). As for the element to be recorded in the Map-point database, at least "X, Y, Z that represent the three-dimensional position of the two-dimensional feature point in the SLAM coordinate system" and "the feature quantity of the two-dimensional feature point" (the feature quantity obtained by, for example, SIFT). In addition, when a "time stamp" (a value or the like of a key frame counter NKF (a variable indicating a present key frame number) when recorded in the Map-point database) is added as the element to be recorded in the Map-point database, edition (for example, recovery to the past condition) of the Map-point database becomes convenient.

Next, the map creator 12 determines (step S215) whether or not all two-dimensional feature points (corresponding feature points) that have the correspondence between the two images are recorded in the Map-point database, and when all two-dimensional feature points are not recorded yet (step S215: NO), the map creator 12 returns the process to the step S213, and when all two-dimensional feature points are recorded (step S215: YES), the map creator 12 progresses the process to step S216.

Next, the position estimator 13 initializes (step S216) the NKF (a variable indicating the counter of a key frame (indicating the image to be processed in the subsequent thread)) to zero, and the second image is recorded (step S217) as the key frame in a frame database (also referred to as a frame DB (DataBase), and stored in the image memory 21).

The elements to be recorded in the frame database are a "key frame number" (the value of the key frame counter NKF at the time of registration), a "posture" (a local device position (translation vector t) in the SLAM coordinate system at the time of image-pickup and a direction (rotation matrix R)), "all extracted two-dimensional feature points", "points which have known three-dimensional positions as the respective Map points among all two-dimensional feature points", and a "feature of the key frame itself". In addition, a "posture in the actual environment measured by the odometry" (a local device position and a direction obtained based on the moved distance by the driver 42 in the actual environment) may also be recorded.

In the above elements, the "feature of the key frame itself" is data to make the process of obtaining the image similarity level between the key frames efficient, and in general, the histogram of the two-dimensional feature point in the image is applicable, but the image itself may be taken as the "feature of the key frame itself". In addition, the "posture measured by the odometry in the actual environment" may be expressed by the translation vector t and the rotation matrix R, but in general, since the autonomous movement device 100 moves on the two-dimensional plane, such an element may be simplified to two-dimensional data, and may be expressed by two-dimensional coordinates (X, Y) and a direction with reference to the position (origin) at the time of the start of movement and the direction.

Next, in order to let the map creating thread to know that the key frame has been created, the position estimator 13 sets (step S218) the key frame counter NKF in the key frame queue (where queue employs a first-in and first-out data structure) of the map creating thread.

Subsequently, in order to obtain a scalar correspondence between the SLAM coordinates and the actual environment coordinates, the position estimator 13 divides the translation distance (obtained by the coordinates in the actual environment) by the odometry by a translation distance d in the SLAM coordinate system estimated through the above process, thereby obtaining (step S219) a scale S.

Figure 5:
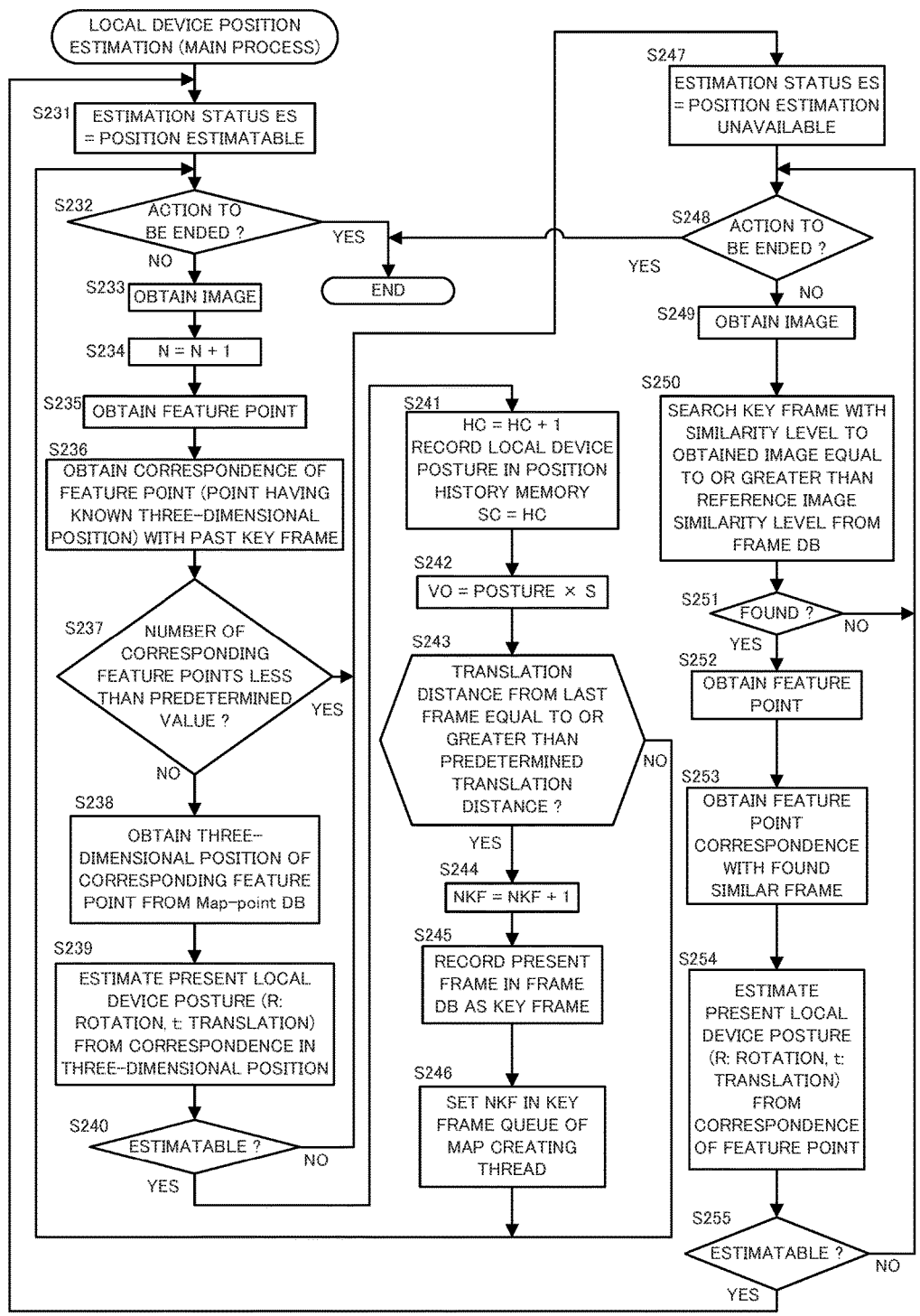
FIG. 5 is a flowchart for a main process after the initialization in the local device position estimating thread of the autonomous movement control process according to the embodiment.

Since the initializing process of the local device position estimating thread has completed through the above processes, the process progresses to the local device position estimation (main process) in FIG. 5 (step S220).

Next, the main process of the local device position estimating thread will be explained with reference to FIG. 5. First, the position estimator 13 sets (step S231) the estimation status variable ES to "position estimatable". This is because, in the initializing process, when the local device position has been estimated, the position estimation can be made at this time point. Next, the position estimator 13 determines (step S232) whether or not to end the action. When the action is to be ended (step S232: YES), the action is ended, and when the action is not to be ended (step S232: NO), the image picker 41 picks up (step S233) an image, and the frame counter N is incremented (step S234).

Subsequently, the position estimator 13 obtains (step S235) the two-dimensional feature point contained in the picked-up image. Next, the two-dimensional feature point that has a known three-dimensional position (the Map point recorded in the Map-point database) among the two-dimensional feature points contained in the information on the image from the information on the past key frame (for example, an image that has the key frame number of NKF) recorded in the frame database, and the two-dimensional feature point that has a correspondence with the presently picked-up image is extracted (step S236).

Next, the estimation determiner 14 determines (step S237) whether or not the number of corresponding feature points is less than a predetermined value (for example, five), and when the number of corresponding feature points is less than the predetermined value (step S237: YES), since the probable local device position is not estimatable, the process progresses to step S247. In this case, instead of immediate progress to the step S247, the process may return to the step S236, and the key frame that has the corresponding feature points which are equal to or greater than the predetermined value may be searched among the key frames recorded in the frame database. In this case, when the key frame that has the corresponding feature points which are equal to or greater than the predetermined value is not found among the key frames recorded in the frame database, the process progresses to the step S247.

When the corresponding feature points that are equal to or greater than the predetermined value are extracted (step S237: NO), the position estimator 13 obtains (step S238) the three-dimensional position $(X_i, Y_i, Z_i)$ of each corresponding feature point from the Map-point database. When the frame coordinates of the corresponding feature point contained in the presently picked-up image are $(u_i, v_i)$, and the three-dimensional position of such a corresponding feature point is expressed as $(X_i, Y_i, Z_i)$ (where i is a value from 1 to the number of corresponding feature points), values $(ux_i, vx_i)$ obtained by projecting the three-dimensional position $(X_i, Y_i, Z_i)$ of each corresponding feature point in a frame coordinate system through the following formula (5) should be ideally consistent with the frame coordinates $(u_i, v_i)$.

$$(ux_i, vx_i, 1)' \sim A(R|t)(X_i Y_i Z_i 1)' \qquad (5)$$

In practice, since $(X_i, Y_i, Z_i)$ and $(u_i, v_i)$ contain errors, $(ux_i, vx_i)$ is hardly consistent with $(u_i, v_i)$ in reality. In addition, although the unknown values are R and t only (in a three-dimensional space, each becomes three-dimensional, and the number of unknown values is 3+3=6), the number of the formulae is twice as much as the number of corresponding feature points (this is because there is a corresponding formula to each of u, v in the frame coordinates per a corresponding feature point), a simultaneous linear equation under the excessive condition is established, and thus the solution should be obtained by the least square scheme as explained above. More specifically, the position estimator 13 is to obtain the posture (the translation vector t and the rotation matrix R) that minimizes a cost function E1 expressed by the following formula (6). This becomes the local device posture (the local device position and the direction expressed by the translation vector t and the rotation matrix R, respectively) in the SLAM coordinate system obtained by the SLAM scheme. The position estimator 13 estimates (step S239) the posture of the local device in this way.

[Formula 1]

$$E1 = \sum_{i=1}^{Number\ of\ corresponding\ feature\ points} ((u_i - ux_i)^2 + (v_i - vx_i)^2) \qquad (6)$$

In the local device position estimation, the estimation value for the posture of the local device is not defined uniquely in some cases (for example, the condition is insufficient and the estimation value is not defined (for example, when the number of corresponding feature points between the two images is less than five), the probable estimation value is not defined uniquely and becomes several candidates even a unique definition through the least square scheme is attempted (for example, the smallest value is smaller than a predetermined value in the formula (6), there are several local minimum values, and the value obtained by dividing the smallest value (the smallest minimum value) by the second smallest minimum value is greater than a predetermined value)). When the position estimator 13 estimates the local device posture (the translation vector t and the rotational matrix R), and when the estimation value is uniquely defined, the estimation determiner 14 determines that the estimation is possible, and when the estimation value is not defined uniquely, the estimation determiner 14 determines that the estimation is unavailable (step S240).

When the estimation determiner 14 determines (step S240: NO) that the estimation is not available, the process progresses to step S247. When the estimation determiner 14 determines (step S240: YES) that the estimation is possible, since the local device posture (the translation vector t and the rotational matrix R) is obtained, the process progresses to step S241.

Since the present local device posture (the translation vector t and the rotational matrix R) in the SLAM coordinate system is obtained, the controller 10 increments the position history record counter HC, records the present local device posture (the translation vector t and the rotational matrix R) in an HC-th field in the position history memory 24 together with a time stamp (for example, a present clock time which can be compared with the time stamp of the position change history memory 23), and sets the position history search counter SC to the value of the position history record counter HC (step S241). In the step S241, the controller 10 corresponds to a position history recorder. Next, the position estimator 13 multiplies the present local device posture by the scale S to obtain (step S242) the Visual Odometry (VO). The VO can be utilized as the local device position and direction in the actual environment.

Next, the position estimator 13 determines (step S243) whether or not the local device has moved by equal to or greater than the predetermined distance (for example, 1 m, hereinafter, referred to as a "reference translation distance") from the local device position when the last key frame (the image that has the key frame number of NKF) recorded in the frame DB, and when the local device has moved by equal to or greater than the reference translation distance (step S243: YES), the position estimator 13 increments (step S244) the key frame counter NKF, and then records (step S245) the present frame as the key frame in the frame DB. When the local device has moved by less than the reference translation distance (step S243: NO), the position estimator 13 returns the process to the step S232.

In this case, the moved distance of the local device to be compared with the reference translation distance may be a translation distance (an absolute vector value (square root of sum of squares of the element) that is a difference in the translation vector between both frames) from the last frame to the present frame obtained by the odometry, or may be obtained by the VO (Visual Odometry) as explained above. The details to be recorded in the frame DB are the "key frame number", the "posture", "all extracted two-dimensional feature points", the "two-dimensional feature points that have known three-dimensional position as the Map points among all two-dimensional feature points", and the "feature of the key frame itself" as explained above.

Subsequently, in order to inform the map creating thread of the creation of the new key frame, the position estimator 13 sets (step S246) the key frame counter NFK in the key frame queue of the map creating thread. Next, the position estimator 13 returns the process to the step S232. Note that the key frame counter NKF, the scale S, the Map-point DB, the frame DB, the position history memory 24, the position change history memory 23, the position history record counter HC, the position history search counter SC, and the position change history counter DC are stored in the memory 20 in such a way that the respective values are also referable in other threads.

Next, an explanation will be given of a process subsequent to the step S247. This is a process when the local device position estimation becomes unavailable. First, the position estimator 13 sets (step S247) the estimation status variable ES as "position estimation unavailable". Next, the position estimator 13 determines (step S248) whether or not to end the action. When the action is to be ended (step S248:

YES), the action is ended, and when the action is not to be ended (step S248: NO), the image picker 41 picks up (step S249) an image.

Subsequently, the controller 10 searches (step S250), from the frame DB, the key frame that has a similarity level relative to the obtained image which is equal to or greater than a predetermined similarity level (for example, 0.9, hereinafter, referred to as the "reference image similarity level"). In this case, when the feature of the image (the key frame) is represented by the feature vector, the similarity level may be the inner product of the absolute values (square root of sum of squares of the element) of the respective feature vectors of the two images normalized to 1. In addition, the inverse number of the distance (square root of sum of squares) of the feature vectors (the absolute value normalized to 1) of the two images may be adopted as the similarity level.

The controller 10 determines (step S251) whether or not the key frame that has the similarity level to the obtained image which is equal to or greater than the reference image similarity level. When the key frame is not found (step S251: NO), the controller 10 returns the process to the step S248. When the key frame is found (step S251: YES), the two-dimensional feature point in the obtained image and the two-dimensional feature point in the found similar image are respectively obtained (step S252), and the correspondence of the two-dimensional feature point between those two images is obtained (step S253).

Next, the local device posture is estimated (step S254) by the same scheme as that of the step S239. At this time, the estimation determiner 14 determines (step S255) whether or not the estimation is possible likewise the step S240, returns the process to the step S248 when the estimation is unavailable (step S255: NO), and progresses the process to step S231 when the estimation is possible (step S255: YES) since this means that the local device position becomes estimatable.

As explained above, after the initialization of the local device position estimating thread, either "position estimation possible" or "position estimation unavailable" is set in the estimation status variable ES, in the main flow illustrated in FIG. 3, when the value of ES indicates "position estimation possible", the autonomous movement device 100 performs a desired action, and when the value of ES indicates "position estimation unavailable", the movement process control is performed so as to seek the position where the position estimation becomes possible.

Figure 6:
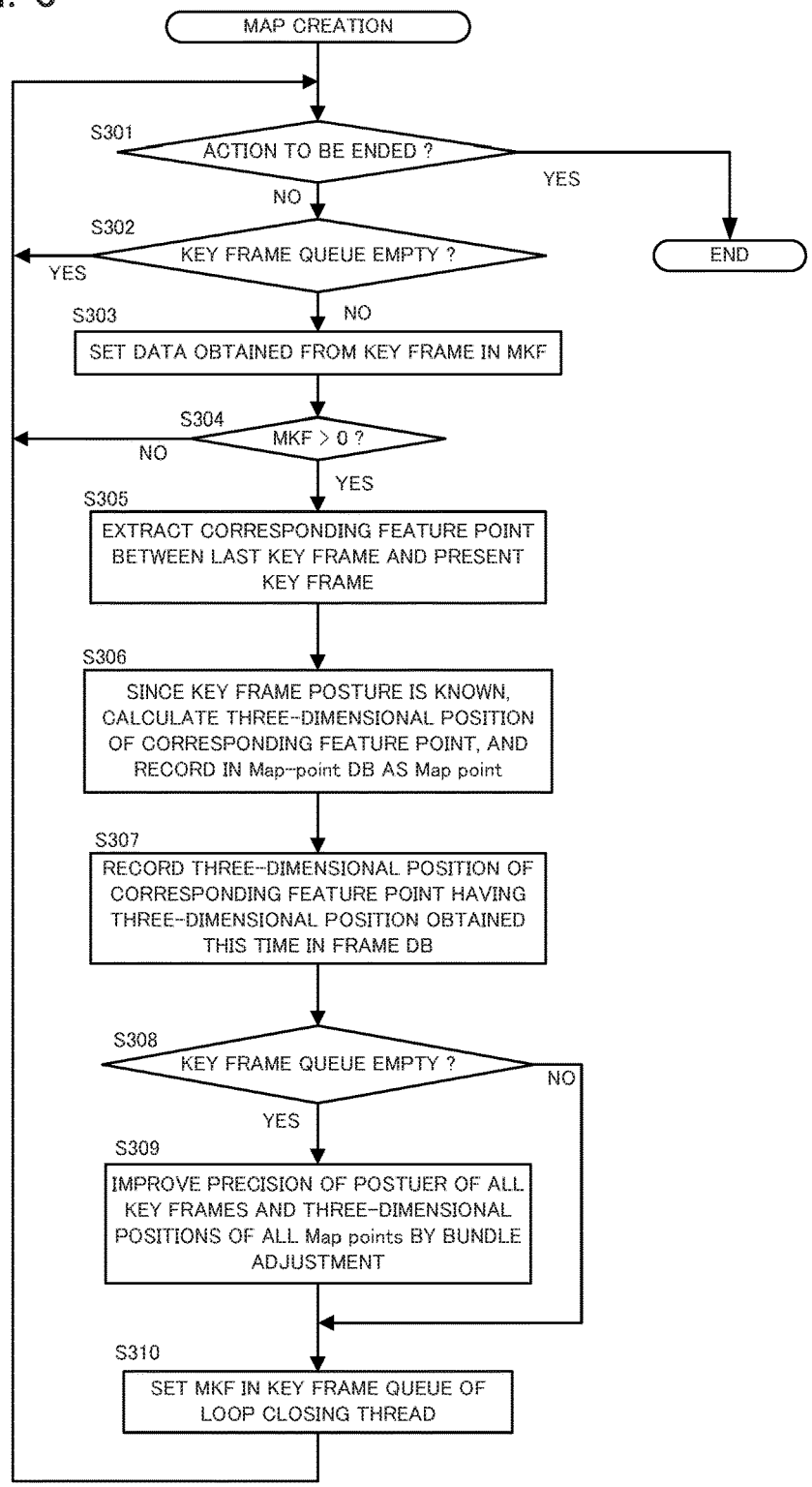
FIG. 6 is a flowchart for a process in a map creating thread of the autonomous movement control process according to the embodiment.

Next, an explanation will be given of the map creating thread launched in the step S102 of the main flow (see FIG. 3) for the autonomous movement device 100 with reference to FIG. 6. In this thread, the map creator 12 calculates the three-dimensional position of the corresponding feature point in the key frame, and creates the map information (Map-point DB).

First, the map creator 12 determines (step S301) whether or not to end the action (step S301). When the action is to be ended (step S301: YES), the action is ended, and when the action is not to be ended (step S301: NO), the map creator 12 determines (step S302) whether or not the key frame queue is empty. When the key frame queue is empty (step S302: YES), the map creator 12 returns the process to the step S301, and when the key frame queue is not empty (step S302: NO), the map creator 12 takes out data from the key frame queue and sets (step S303) to the MKF (a variable indicating the key frame number of the key frame to be processed in the map creating thread). The map creator 12 determines (step S304) whether or not the MKF is zero, and when the MKF is zero (step S304: NO), the map creator 12 returns the process to the step S301, and waits for until the data is entered in the key frame queue. When the MKF is equal to or greater than 1 (step S304: YES), the process progresses to the following process.

The map creator 12 refers to the frame DB, and extracts (step S305) the two-dimensional feature point (the corresponding feature point) that has the correspondence between the previous frame (the key frame that has the key frame number of MKF−1) and the present key frame (the key frame that has the key frame number of MKF). Since the postures (the translation vectors t and the rotation matrices R) of the respective key frames are also recorded in the frame DB, the three-dimensional position of the corresponding feature point is calculatable by the same process at the time of the initializing process in the local device position estimating thread. The map creator 12 records (step S306) the corresponding feature point which has the calculated three-dimensional position in the Map-point DB as the Map point. The map creator 12 also records (step S307), in the frame DB, the three-dimensional position for the two-dimensional feature point that has the calculated three-dimensional position at this time.

Note that when the extracted corresponding feature point by the map creator 12 has been already recorded in the Map-point DB, the three-dimensional position calculation may be skipped and the process for the next corresponding feature point (which is not recorded in the Map-point DB yet), or a three-dimensional position calculation may be executed again, and the three-dimensional position already recorded in the Map-point DB or the three-dimensional position of the corresponding feature point in the frame DB may be updated.

Next, the map creator 12 determines (step S308) whether or not the key frame queue is empty. When the key frame queue is empty (step S308: YES), a bundle adjustment process is performed on the postures of all key frames and the three-dimensional positions of all Map points so as to improve the precision (step S309), and the map creator 12 returns the process to the step S310. When the key frame queue is not empty (step S308: NO), the process progresses to the step S310. Subsequently, the map creator 12 sets (step S310) the MKF in the key frame queue of the loop closing thread, and returns the process to the step S301.

Note that the bundle adjustment process is a non-linear optimization scheme that simultaneously estimates both the camera posture (the key frame posture) and the three-dimensional position of the Map point, and performs an optimization so as to minimize an error produced when the Map point is projected on the key frame.

By executing this bundle adjustment process, the precision of the key frame posture and that of the three-dimensional position of the Map point are improved. When, however, this process is not executed, simply improvement of the precision is not accomplished, which does not bring any technical problem. Hence, execution of this process is not always necessary every time there is no other process (when, for example, the key frame queue is empty).

In addition, by executing the bundle adjustment process, a Map point that has a larger error than the predetermined value when projected on the key frame may be found. Such a Map point with a large error affects the SLAM estimation. Hence, this Map point may be deleted from the Map-point DB and the frame DB or a flag to identify that this Map point has a large error and needs an attention may be set up. Note that the bundle adjustment process is optional according to this embodiment, and thus the explanation for the process detail will be omitted in this specification.

Figure 7:
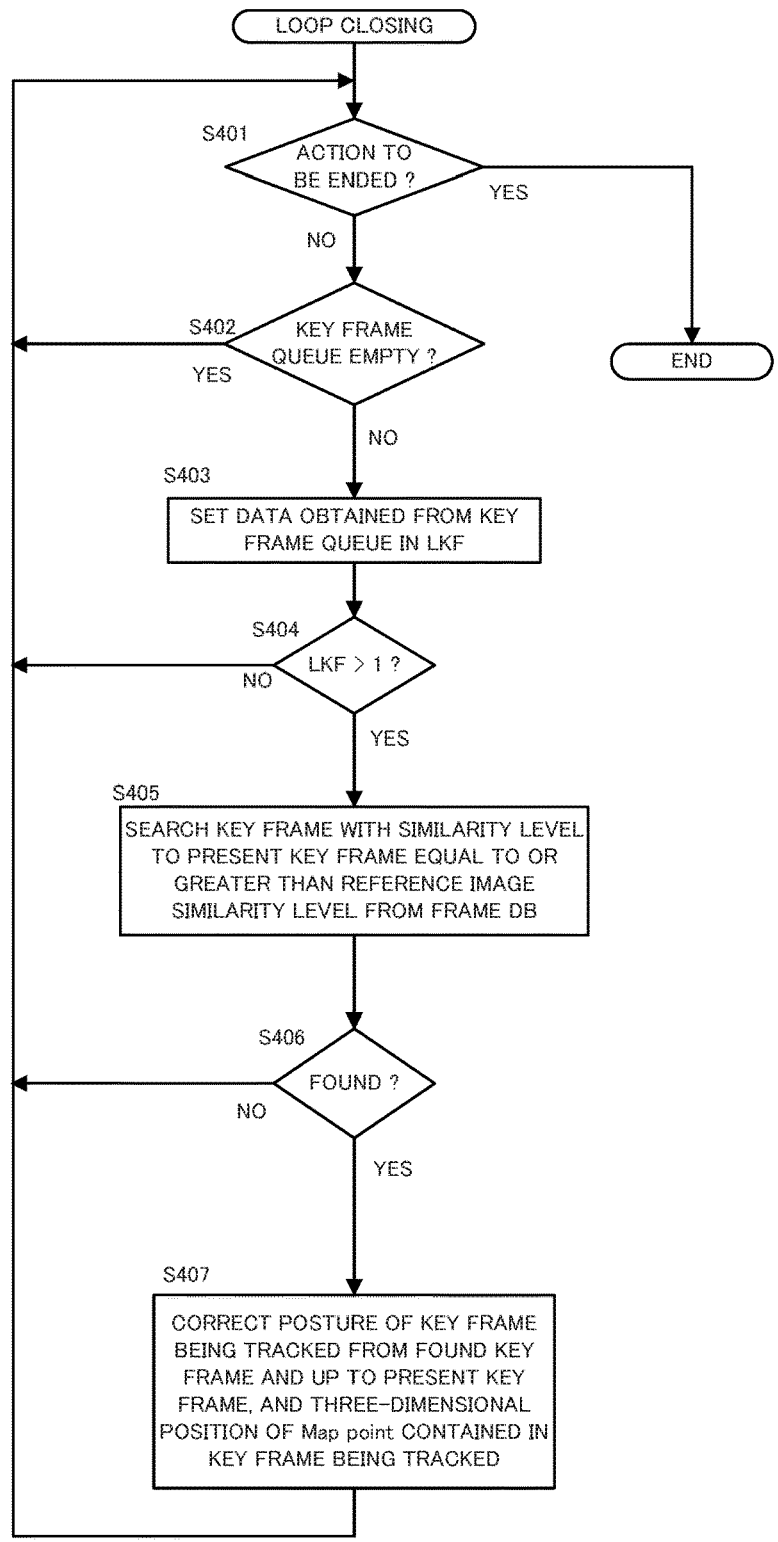
FIG. 7 is a flowchart for a process in a loop closing thread of the autonomous movement control process according to the embodiment.

Next, an explanation will be given of the loop closing thread launched in the step S103 in the main flow (see FIG. 3) for the autonomous movement device 100 with reference to FIG. 7. In this thread, the controller 10 keeps checking whether or not the loop closing process is executable, and executes the loop closing process when determining as executable. Note that the loop closing process is to correct, based on a difference between the posture value when reached this site last time and the present posture value, the key frame being tracked up to the present time after reached this site last time and the three-dimensional position of the relevant Map point when the controller 10 recognized that the local device has returned to the site where the local device once reached in past.

First, the controller 10 determines (step S401) whether or not to end the action. When the action is to be ended (step S401: YES), the action is ended. When the action is not to be ended (step S401: NO), the controller 10 determines whether or not the key frame queue is empty (step S402). When the key frame queue is empty (step S402: YES), the controller 10 returns the process to the step S401, and when the key frame queue is not empty (step S402: NO), the controller 10 takes out data from the key frame queue, and sets (step S403) in an LKF (a variable indicating the key frame number of the key frame to be processed in the loop closing thread). Next, the controller 10 determines (step S404) whether or not the LKF is greater than 1. When the LKF is zero or 1 (step S404: NO), the controller 10 returns the process to the step S401, and waits for until the data is entered in the key frame queue. Next, when the LKF is equal to or greater than 2 (step S404: YES), the following process is executed.

The controller 10 refers to the frame DB, and searches (step S405), from the frame DB, the key frame that has a similarity level which is of the "feature of the key frame itself" relative to the present key frame (the key frame that has the key frame number of LKF), and which is equal to or greater than a predetermined similarity level.

The controller 10 determines (step S406) whether or not the key frame that has the similarity level of the "feature of the key frame itself" which is equal to or greater than the reference image similarity level. When no such a frame is found (step S406: NO), the process returns to the step S401, and when such a frame is found (step S406: YES), the key frame posture being tracked from the found key frame to the present key frame, and the three-dimensional position of the Map point in the key frame being tracked are corrected (step S407). For example, the controller 10 corrects the posture of the present key frame to the posture of the found key frame. Next, using a difference between the posture of the found key frame and that of the present key frame, the posture of each key frame being tracked from the found key frame and up to the present key frame is corrected linearly. In addition, the three-dimensional position of the Map point contained in each key frame is also corrected in accordance with the correction amount of the posture of each key frame. Subsequently, the process returns to the step S401.

Figure 8:
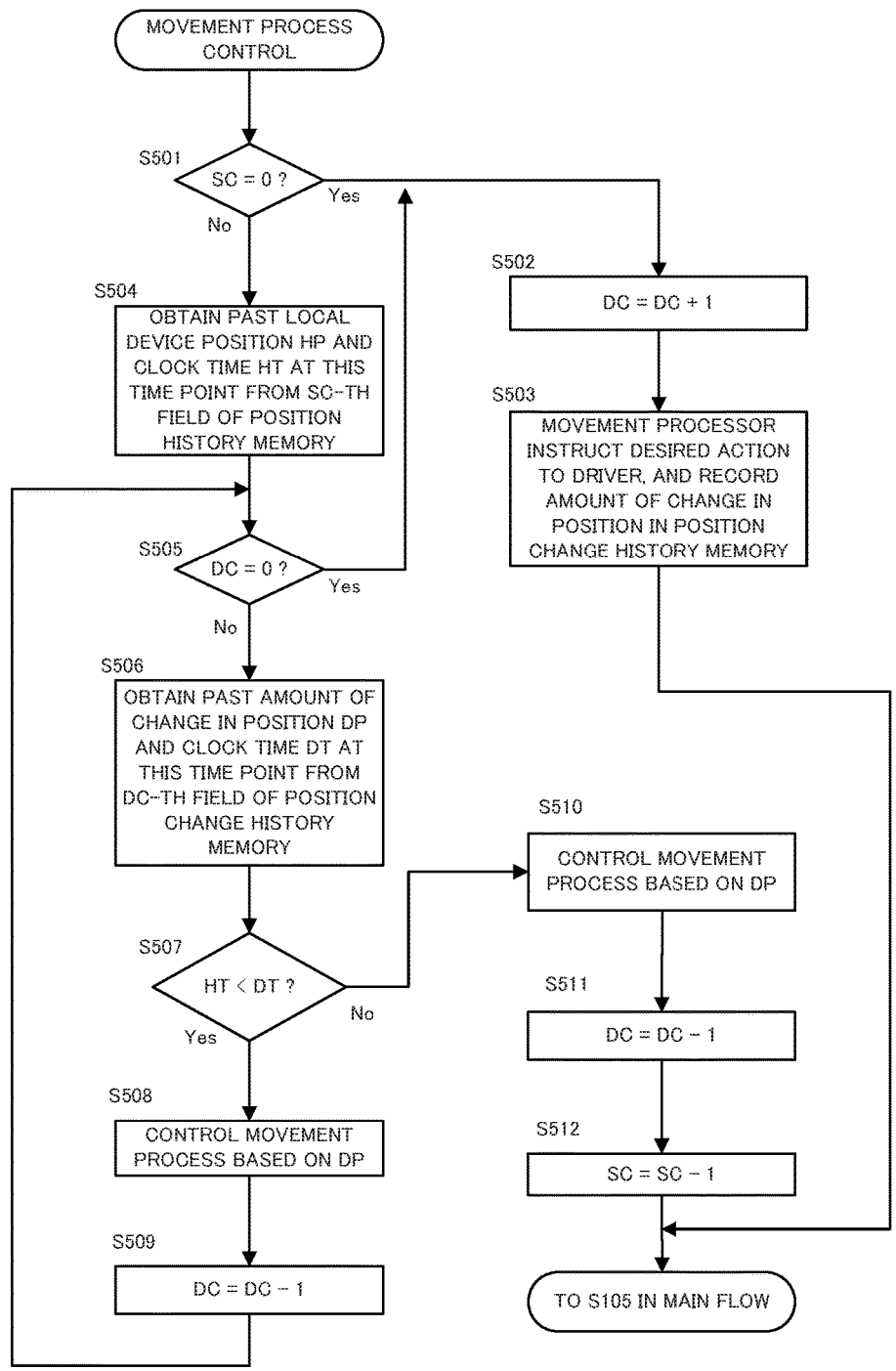
FIG. 8 is a flowchart for a process of a movement process control in the autonomous movement control process according to a first embodiment.

Next, an explanation will be given of the movement process control that is a process at the step S110 in the main flow (see FIG. 3) for the autonomous movement device 100 with reference to FIG. 8. First, the controller 10 determines (step S501) whether or not the value of the position history search counter SC is 0. When SC is 0, this means that although a return process is attempted to all positions stored in the position history memory 24, the position estimation is still not enabled. In this case (step S501: YES), in order to perform an autonomous movement under a condition in which the position is not estimated, the similar actions to those of the steps S108, S109 in the main flow (see FIG. 3) are executed (step S502, S503), and the process returns to the step S105 in the main flow (see FIG. 3).

When SC is not 0 (step S501: NO), the SC-th information (information on the local device posture (position) and the clock time at this time point) stored in the position history memory 24 is obtained (step S504). Among the pieces of obtained information, the information on the local device posture (position), and the clock time are stored in HP (a variable for storing information on the local device position obtained from the position history memory 24) and HT (a variable for storing the obtained clock time from the position history memory 24), respectively. Next, whether or not the value of the position change history counter DC is 0 is determined (step S505). When DC is 0, this means that although a change in all positions stored in the position change history memory 23 is attempted, the position estimation is still not enabled. In this case (step S505: YES), in order to perform an autonomous movement under a condition in which the position is not estimated, the similar actions to those of the steps S108, S109 in the main flow (see FIG. 3) are executed (step S502, S503), and the process returns to the step S105 in the main flow (see FIG. 3).

When DC is not 0 (step S505: NO), the DC-th information (the amount of change in position and the clock time at this time point) stored in the position change history memory 23 is obtained (step S506). Among the pieces of obtained information, the amount of change in position, and the clock time are stored in DP (a variable for storing the amount of change in position obtained from the position change history memory 23) and DT (a variable for storing the obtained clock time from the position change history memory 23), respectively. Subsequently, whether or not the obtained clock time HT from the position history memory 24 is a past time (a smaller value) relative to the obtained clock time DT from the position change history memory 23 is determined (step S507).

When HT is a past time relative to DT (step S507: YES), since the local device has not returned yet to the position at the past HP obtained from the position history memory 24, the process progresses to step S508. When HT is the same time as DT or DT is the past time (step S507: NO), in order to execute a final movement process in the movement process control, the process progresses to step S510.

In the step S508, the movement process controller 15 causes the movement processor 11 to execute a movement process of canceling the amount of change in position based on the amount of change in position DP recorded in the position change history memory 23 (step S508). When, for example, DP indicates "moved forward by 10 cm", the movement process in this case becomes "move back by 10 cm". Next, the position change history counter DC is decremented (step S509), and the process returns to the step S505.

In the step S510, like the step S508, the movement process controller 15 causes the movement processor 11 to execute the movement process (step S510) of canceling the amount of change in position based on the amount of change in position DP recorded in the position change history memory 23. This movement process causes the autonomous movement device 100 to return to the position (the position indicated by HP) where the position estimation was possible in past (when information stored in the position change history memory 23 and the moved distance by the movement processor 11 contain no error). Hence, in order to enable a proper local device position estimation in the local device position estimating thread, this final movement process is desirably executed at a reduced speed. When, in particular, the value of HT and that of DT are equal at the determination in the step S507, the autonomous movement device 100 is to return to the position indicated by HP through this movement. Hence, a process of causing the autonomous movement device 100 to stop by a predetermined time without a movement may be added between the step S510 and the step S511 (in order to wait for the execution of the local device position estimation in the local device position estimating thread).

Next, the position change history counter DC is decremented (step S511), the position history search counter SC is decremented (step S512), and the process returns to the step S105 in the main flow. The reason why the position history search counter SC is decremented is because, when the local-position estimation is not enabled in the local device position estimating thread even by the present movement process control, the local device position estimation is attempted in the next movement process control so as to return to a further past position. When, however, the local device position estimation becomes successful up to the next movement process control, the value of the position history record counter HC is set in the position history search counter SC at the step S241 in FIG. 5. By executing such a movement process control, the local device position estimation is enabled upon returning to the position where the local device position estimation was possible in past.

Figure 9:
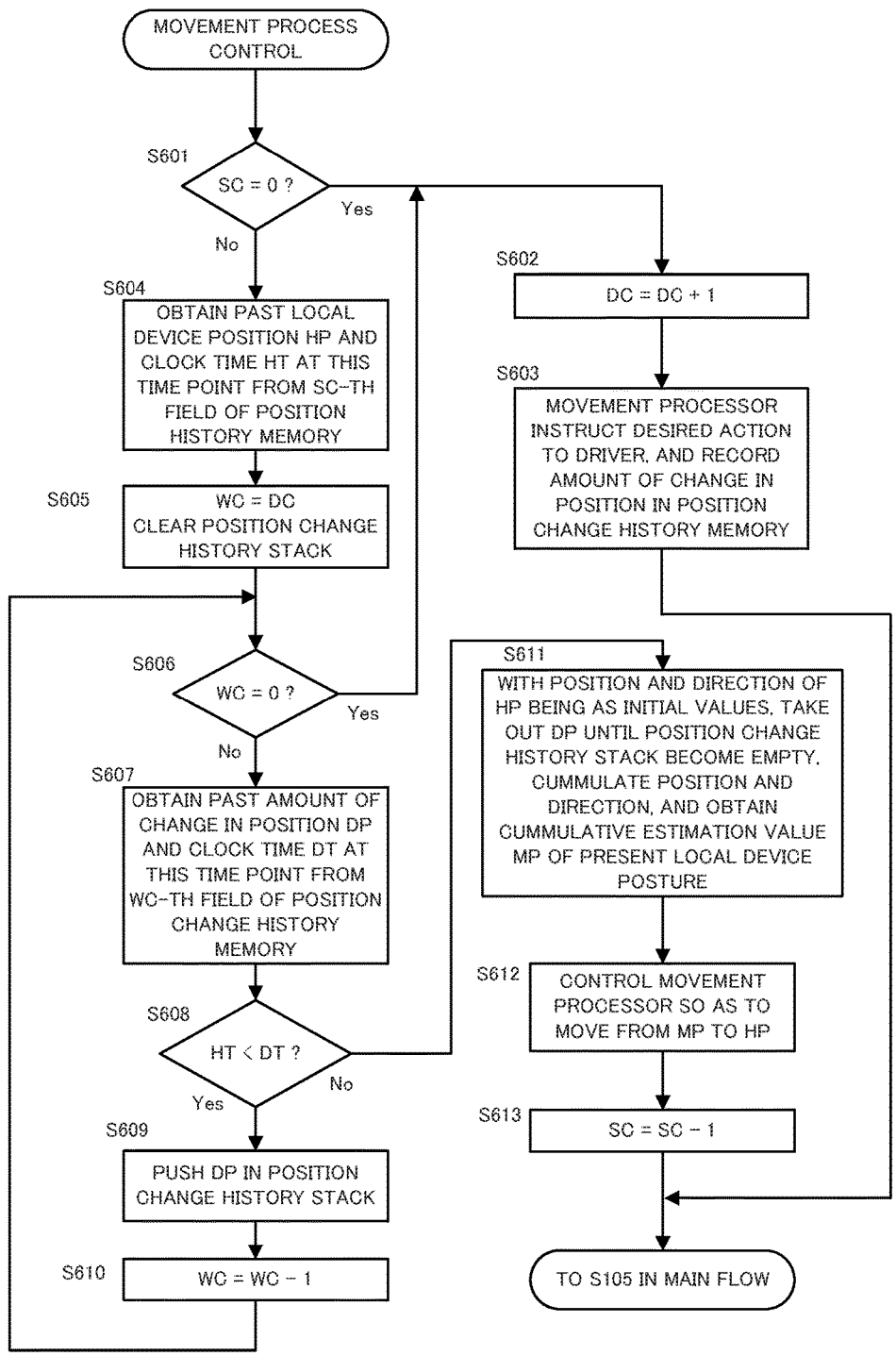
FIG. 9 is a flowchart for a process of a movement process control in the autonomous movement control process according to a second embodiment.

Subsequently, as a different movement process control from the above-explained process, an explanation will be given of a second embodiment in which a movement process control illustrated in a flowchart that is FIG. 9 is executed. The second embodiment is the same as the first embodiment except the flowchart for the movement process control.

First, the controller 10 determines (step S601) whether or not the value of the position history search counter SC is 0. When SC is 0, this means that although a return process is attempted to all positions stored in the position history memory 24, the position estimation is still not enabled. In this case (step S601: YES), in order to perform an autonomous movement under a condition in which the position is not estimated, the similar actions to those of the steps S108, S109 in the main flow (see FIG. 3) are executed (step S602, S603), and the process returns to the step S105 in the main flow (see FIG. 3).

When SC is not 0 (step S601: NO), the SC-th information (information HP on the posture (translation vector t and rotational matrix R) of the local device and the clock time HT at this time point) stored in the position history memory 24 is obtained (step S604). Next, the value of the position change history counter DC is set in a position change history work counter WC (a variable utilized when the history of position change is obtained from the position change history memory 23), and a position change history stack (a stack for storing the amount of change in position) is initialized (step S605). Note that the position change history stack employs a first-in and last-out data structure.

Next, the controller 10 determines (step S606) whether or not the position change history work counter WC is 0. When WC is 0, this means that although a change is attempted to all positions stored in the position change history memory 23, the position estimation is still not enabled. In this case (step S606: YES), in order to perform an autonomous movement under a condition in which the position is not estimated, the similar actions to those of the steps S108, S109 in the main flow (see FIG. 3) are executed (step S602, S603), and the process returns to the step S105 in the main flow (see FIG. 3).

When WC is not 0 (step S606: NO), the controller 10 obtains (step S607) the WC-th information (the amount of change in position DP and the clock time DT at this time point) stored in the position change history memory 23. Next, whether or not the obtained clock time HT from the position history memory 24 is a past time (smaller value) relative to the obtained clock time DT from the position change history memory 23 is determined (step S608).

When HT is a past time relative to DT (step S608: YES), since the local device has not returned yet to the position at the past HP obtained from the position history memory 24, the process progresses to step S609. When HT is the same time as DT or DT is the past time (step S608: NO), in order to perform a cumulative estimation of the local device position from the position change history, the process progresses to step S611.

In the step S609, the controller 10 pushes the value of the amount of change in position DP in the position change history stack. Next, the controller 10 decrements (step S610) the position change history work counter WC, and returns the process to step S606. Hence, the amount of change in position up to this time point is accumulated in the position change history stack.

In the step S611, the controller 10 executes a process of setting an initial value that is the posture (the translation vector t and the rotational matrix R) of the past HP obtained from the position history memory 24 in MP (a variable utilized to obtain the estimation value for the local device position), taking out data (DP) from the position change history stack, and adds in MP until the position change history stack becomes empty. Hence, as for MP, the estimation value for the present local device position obtained by cumulating the position change history DP is obtainable from the position HP where the local device position estimation was possible. In this process, the controller 10 corresponds to a cumulative position estimator.

Next, the movement process controller 15 controls (step S612) the movement processor 11 so as to move from the estimation value MP for the present local device position to the past local device position HP. More specifically, a control is made in such a way that a translation movement by what corresponds to a subtraction of the translation vector of MP from the translation vector of HP is performed, and a rotation action by what corresponds to a rotation indicated by the rotational matrix obtained by multiplying the rotational matrix of HP by the inverse matrix of the rotational matrix of MP is performed. This movement process causes the autonomous movement device 100 to return to the position (the position indicated by HP) where the position estimation was possible in past (when information stored in the position change history memory 23 and the moved distance by the movement processor 11 contain no error). Hence, a process of causing the autonomous movement device 100 to stop by a predetermined time without a movement may be added between the step S612 and the step S613 (in order to wait for the execution of the local device position estimation in the local device position estimating thread).

Next, the position history search counter SC is decremented (step S613), and the process returns to the step S105 in the main flow. The reason why the position history search counter SC is decremented is because, when the local-position estimation is not enabled in the local device position estimating thread even by the present movement process control, the local device position estimation is attempted in the next movement process control so as to return to a further past position. When, however, the local device position estimation becomes successful up to the next movement process control, the value of the position history record counter HC is set in the position history search counter SC at the step S241 in FIG. 5. By executing such a movement process control, the local device position estimation is enabled upon returning to the position where the local device position estimation was possible in past.

In comparison with the first embodiment, the second embodiment has an advantage such that the movement process is not executed for each position change stored in the position change history memory 23 but is executed collectively, and thus an error is not likely to be accumulated on the driver 42 at the time of movement process control.

The two embodiments explained up to this paragraph both have the process of returning to the position where the local device position estimation was possible in past, but there is a technical problem such that when the information stored in the position change history memory 23 and the moved distance by the movement processor 11 are inaccurate, a return to the proper past position is difficult.

Figure 10:
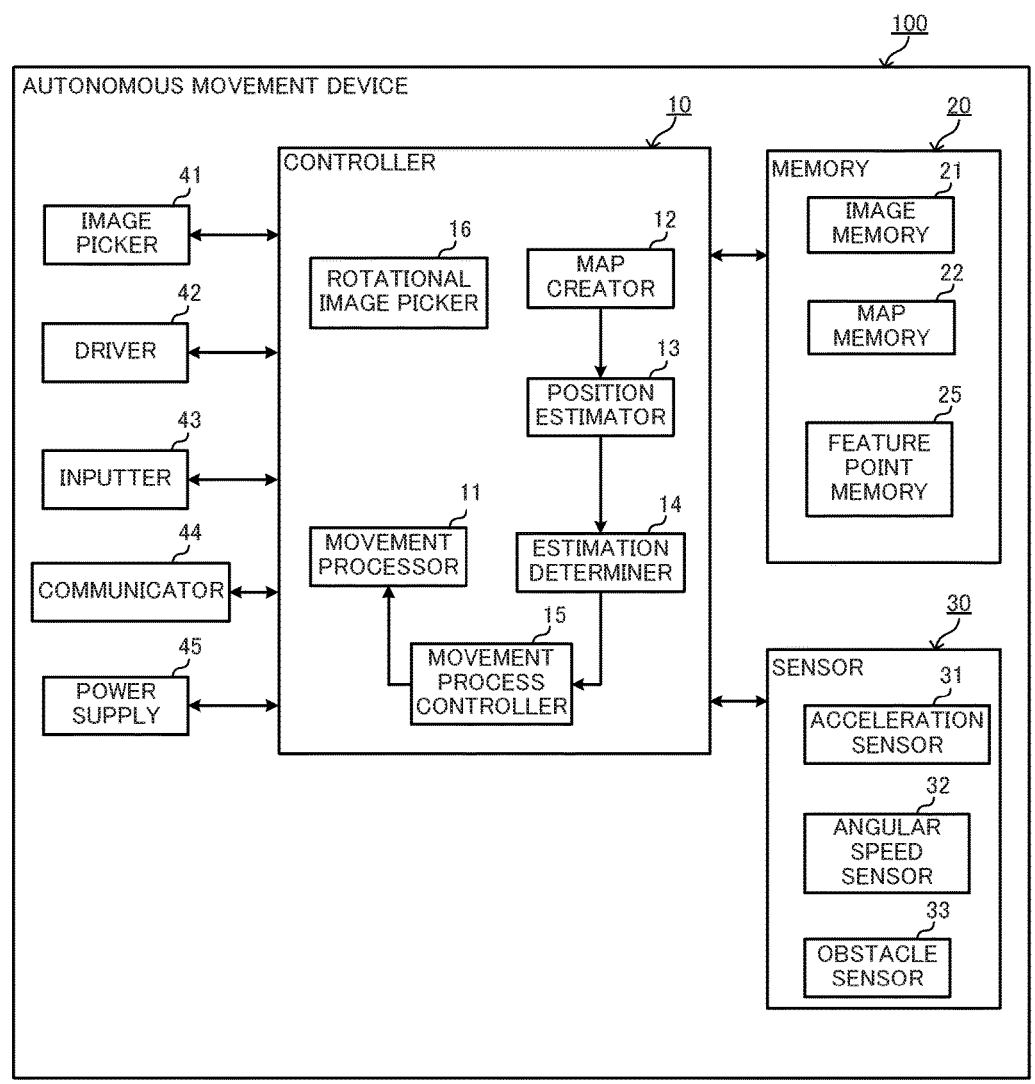
FIG. 10 is a diagram illustrating a structure of an autonomous movement device according to a third embodiment.

Hence, an explanation will be given of a third embodiment that does not need the position change history memory 23 and the position history memory 24. A structure according to the third embodiment is illustrated in FIG. 10. What is different from the first and second embodiments is that the controller 10 includes a rotational image picker 16, and the memory 20 includes no position change history memory 23 and position history memory 24, but includes a feature point memory 25.

Figure 11:
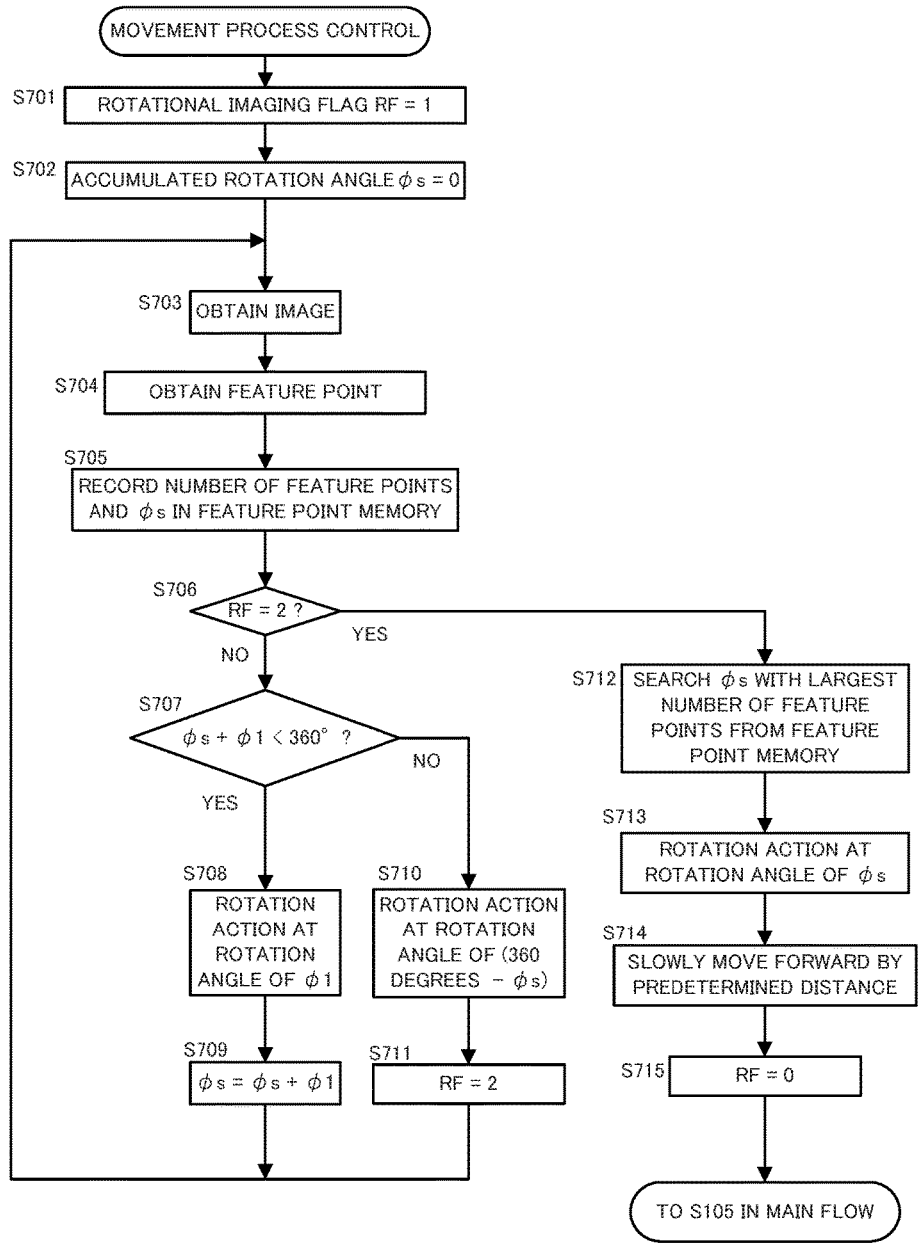
FIG. 11 is a flowchart for a process of a movement process control in the autonomous movement control process according to the third embodiment.

The respective flows in FIGS. 3-7 are the same as the process flows in the third embodiment except that the processes relating to the position change history counter DC, the position change history memory 23, the position history record counter HC, and the position history search counter SC are omitted. However, the process flow of the movement process control is quite different from those of the first and second embodiments, and will be explained below with reference to FIG. 11.

First, the rotational image picker 16 sets a rotational imaging flag RF (a variable indicating whether or not the rotational imaging is in progress) to 1 (step S701), and clears out an accumulated rotation angle $\phi_s$ (step S702). Next, the image picker 41 picks up (step S703) an image. Subsequently, the two-dimensional feature point is obtained (step S704) from the obtained image. Next, the number of obtained two-dimensional feature points and the accumulated rotation angle $\phi_s$ are recorded (step S705) in the feature point memory 25.

Subsequently, the rotational image picker 16 determines (step S706) whether or not the rotational imaging flag RF is 2. When RF is 2 (step S706: YES), this means that an image-pickup by what corresponds to a single rotation completes, and the process progresses to step S712. When RF is not 2 (step S706: NO), the rotational image picker 16 determines (step S707) whether or not the accumulated rotation angle $\phi_s$+a rotation angle $\phi_1$ is less than 360 degrees. In this case, the rotation angle $\phi_1$ is a rotation angle by what corresponds to a single rotation action by the rotational image picker 16, and is, for example, 30 degrees. $\phi_1$ is preferably set to an angle equal to or less than the half of the view angle of the image picker 41 in order to pick up the feature points as much as possible from the surrounding environments.

When the accumulated rotation angle $\phi_s$+the rotation angle $\phi_1$ is less than 360 degrees (step S707: YES), the rotational image picker 16 instructs (step S708) the driver 42 to perform a rotation action at the rotation angle $\phi_1$, adds (step S709) the rotation angle $\phi_1$ to the accumulated rotation angle $\phi_s$, and returns the process to the step S703. The rotation action in this case is desirably a rotation action that has no positional displacement if a rotation while remaining at the same position is possible by, for example, turning the two wheels of the driver 42 in the opposite directions at the same speed. When the two wheels are capable of turning in the same direction only, a rotation action that has a rotational radius as small as possible is desirable.

When the accumulated rotation angle $\phi_s$+the rotation angle $\phi_1$ is equal to or greater than 360 degrees (step S707: NO), the rotational image picker 16 instructs (step S710) the driver 42 to perform a rotation action at a rotation angle of (360 degrees−$\phi_s$), sets (step S711) the rotational imaging flag RF to 2, and returns the process to the step S703.

In the step S712, the movement process controller 15 searches, from the feature point memory 25, the accumulated rotation angle $\phi_s$ when the number of recorded two-dimensional feature points in the feature point memory 25 is the largest number, and controls (step S713) the movement processor 11 so as to perform a rotation action at the rotation angle $\phi_s$. Subsequently, the movement process controller 15 controls (step S714) the movement processor 11 so as to move forward slowly by a predetermined distance (for example, three times as much as the reference translation distance). The slow movement increases the timings at which the local device position is estimatable through the local device position estimating thread.

Subsequently, the rotational image picker 16 clears out (step S715) the rotational imaging flag RF to 0, and returns the process to the step S105 of the main flow. By executing such an action, the movement is made in the direction in which the number of feature points is large, increasing the possibility that the local device position estimation becomes successful. Note that in this embodiment, only the number of two-dimensional feature points is focused, but in addition to the number of feature points, the quality of the feature point may be also focused, an evaluation function with respect to the number of two-dimensional feature points and the quality may be defined, and in the step S712, a process of searching the rotational angle $\phi_s$ that maximizes the two-dimensional-feature-point evaluation function may be executed.

In addition, the respective movement process controls of the first, second, and third embodiments may be changed over and executed as appropriate. When, for example, the local device position estimation is not enabled through the movement process control of the first embodiment, the movement process control of the third embodiment may be executed. In addition, when the local device position estimation is not enabled through the movement process control of the second embodiment, the movement process control of the third embodiment may be executed. Still further, when the local device position estimation is not enabled through the movement process control of the first embodiment, the movement process control of the second embodiment may be executed, and the local device position estimation is still not enabled through the movement process control of the second embodiment, the movement process control through the third embodiment may be executed.

Note that in the above embodiment, the value of the reference translation distance is set to, for example, "1 m", but the optimized reference translation distance changes in accordance with the size of het autonomous movement device itself and the speed thereof, the environment in which the autonomous movement device 100 moves, the movement range, and the like. Accordingly, how to set the reference translation distance will be supplementary explained below.

As the setting scheme of the reference translation distance, such a reference translation distance may be set in accordance with a ratio between the average value (=an average distance of the depths up to all Map points observed in the key frame) of the distance from the three-dimensional positions of all Map points (the two-dimensional feature points that have the known three-dimensional position) over the key frame and to the local device, and, the translation distance (for example, the distance that is 5% of the average distance of the depths up to the Map points is set as the reference translation distance). "All Map points" applied in this case are extractable by the controller 10 that refers to the Map-point DB, and in this process, the controller 10 corresponds to a position estimatable feature point extractor. In addition, when, for example, the autonomous movement device 100 moves on a surface of a table, the reference translation distance may be set to 10 cm, when the autonomous movement device 100 moves on a floor of a room, the reference translation distance may be set to 1 m, and when the autonomous movement device 100 moves around an outdoor open space, the reference translation distance may be set to 10 m, in accordance with the translation distance in the actual environment. Alternatively, the value in accordance with the wheel diameter of the driver 42 (for example, 10 times as much as the wheel diameter) may be set as the reference translation distance.

When the reference translation distance is set in accordance with the distance in the actual environment, as for the translation distance in the SLAM coordinate system, a conversion to the distance in the actual environment by multiplication of the scale S is executed for the comparison (the same is true in the opposite case, and when the distance in the SLAM coordinate system is set as the reference translation distance, the distance in the actual environment is divided by the scale S so as to be converted into the distance in the SLAM coordinate system for the comparison).

Note that the respective functions of the autonomous movement device 100 according to the present disclosure are realizable by a general computer like a Personal Computer (PC). More specifically, in the above embodiment, the explanation has been given of an example case in which the program for the autonomous movement control process executed by the autonomous movement device 100 is stored in the ROM of the memory 20 beforehand. However, the program may be distributed in a manner recorded in a non-transitory computer-readable recording medium, such as a flexible disk, a Compact Disc Read Only Memory (CD-ROM), a Digital Versatile Disc (DVD), or a Magneto-Optical disc (MO), and may be read and installed in a computer to accomplish the computer that realizes the respective functions explained above.

Figure 12:
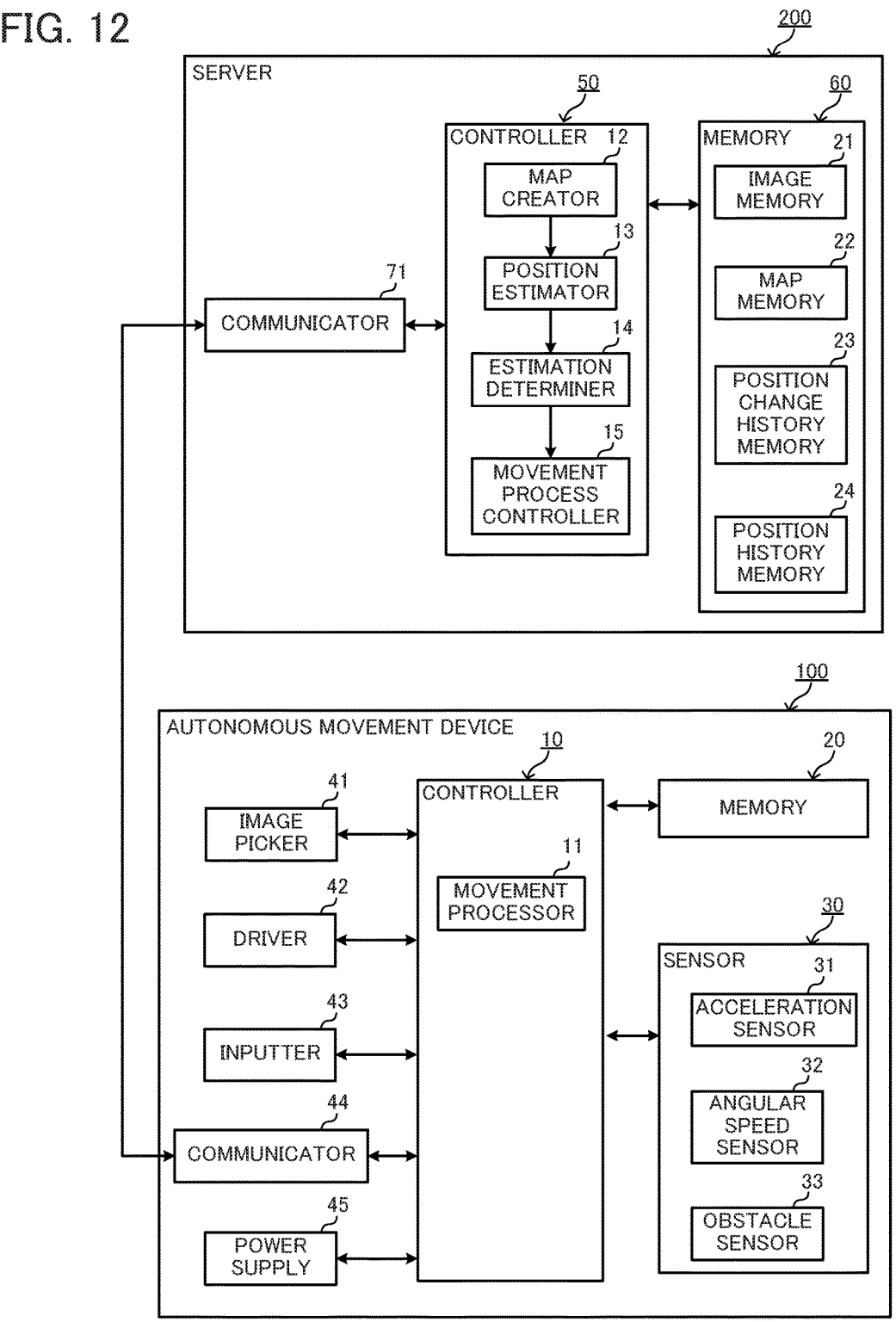
FIG. 12 is a diagram illustrating an example structure in which a part of a controller, and the like, is provided in an external server.

In addition, this computer may be built in the autonomous movement device 100 or may be an individual apparatus from the autonomous movement device 100. That is, as illustrated in FIG. 12, the controller, the memory, and the like may be provided in an external server 200. In accordance with a cloud-computing technology, the controller 10 of the autonomous movement device 100 may transmit data obtained by the image picker 41, the sensor 30, and the like to the external server 200 via the communicator 44, cause the external server 200 to execute arithmetic processing, receive the arithmetic process result by the external server 200 via the communicator 44, and control the driver 42 and the like. In FIG. 12, a controller 50 of the external server 200 includes the map creator 12, the position estimator 13, the estimation determiner 14, and the movement process controller 15, and the controller 10 of the autonomous movement device 100 includes the movement processor 11. However, either the controller 50 of the external server 200 or the controller 10 of the autonomous movement device 100 may include the respective components. Which one of either the controller 50 of the external server 200 or the controller 10 of the autonomous movement device 100 may include the respective components is a design option that may be addressed as appropriate.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An autonomous movement device comprising:
an image picker;
an image memory;
a position change history memory;
a controller; and
a driver,
wherein:
the image memory stores information on a plurality of images picked up by the image picker, and
the controller:
executes a drive process for the driver so as to move autonomously based on information on an image picked up by the image picker;
executes a local device position estimating process that estimates a local device position in a real-time manner, using the information on the plurality of images stored in the image memory;
determines whether or not an estimation result of the local device position is uniquely defined;
records, every time the local device position is changed by the drive process, an amount of change in position in the position change history memory; and
upon determination that the estimation result is not uniquely defined:
(i) executes a reverse-direction movement control that controls the drive process so as to move the autonomous movement device in a reverse direction to the amount of change in position recorded in the position change history memory such that the autonomous movement device moves to a position where the estimation result of the local device position is uniquely defined; and
(ii) by executing the local device position estimating process in a real-time manner during execution of the reverse-direction movement control, estimates the local device position using the information on the plurality of images picked up by the image picker during the execution of the reverse-direction movement control and stored in the image memory.

2. The autonomous movement device according to claim 1, further comprising a communicator that communicates with an external server, wherein at least one of the drive process, the estimation, the determination, and the control by the controller is executed by the external server via the communicator.

3. The autonomous movement device according to claim 1, wherein the controller further obtains corresponding feature points from the plurality of images, and determines that the estimation result is not defined uniquely when a number of the corresponding feature points obtained from the plurality of images utilized for the local device position estimation is less than a predetermined number.

4. The autonomous movement device according to claim 1, wherein the controller further obtains corresponding feature points from the plurality of images, estimates the local device position by minimizing a cost function that is defined based on a coordinate of the obtained feature point in the image, and determines that the estimation result is not defined uniquely when a minimum value of the cost function is greater than a predetermined value.

5. The autonomous movement device according to claim 1, wherein the controller further obtains corresponding feature points from the plurality of images, estimates the local device position by minimizing a cost function that is defined based on a coordinate of the obtained feature point in the image, and determines that the estimation result is not defined uniquely when the cost function includes a plurality of minimum values, and a value obtained by dividing a smallest minimum value from the plurality of minimum values by a second smallest minimum value from the plurality of minimum values is greater than a predetermined value.

6. The autonomous movement device according to claim 1, further comprising a position history memory;
wherein the controller records, upon determination that the estimation result is uniquely defined, information on the position at a time point of the determination that the estimation result is uniquely defined, together with clock time information indicating a clock time at the time point, in the position history memory, and controls, upon determination that the estimation result is not uniquely defined, the drive process so as to move in the reverse direction to the amount of change in position recorded in the position change history memory while tracking back to the time point at which the local device was located at the position recorded in the position history memory.

7. An autonomous movement device comprising:
an image picker;
an image memory;
a position change history memory;
a position history memory;
a controller; and
a driver,
wherein:
the image memory stores information on a plurality of images picked up by the image picker, and
the controller:
executes a drive process for the driver so as to move autonomously based on information on an image picked up by the image picker;
executes a local device position estimating process that estimates a local device position in a real-time manner, using the information on the plurality of images stored in the image memory;

determines whether or not an estimation result of the local device position is uniquely defined;

records, every time the local device position is changed by the drive process, an amount of change in position in the position change history memory;

records, upon determination that the estimation result is uniquely defined, information on the position at a time point of the determination that the estimation result is uniquely defined, together with clock time information indicating a clock time at the time point, in the position history memory;

estimates a present local device position by cumulating, to the position recorded in the position history memory, the amount of change in position recorded in the position change history memory from the clock time corresponding to the position and up to a present clock time upon determination that the estimation result is not uniquely defined; and upon determination that the estimation result is not uniquely defined:

(i) executes a return movement control that controls the drive process so as to move the autonomous movement device toward the position recorded in the position history memory from the position estimated by the cumulating such that the autonomous movement device moves to a position where the estimation result of the local device position is uniquely defined, and (ii) by executing the local device position estimating process in a real-time manner during execution of the return movement control, estimates the local device position using the information on the plurality of images picked up by the image picker during execution of the return movement control and stored in the image memory.

8. The autonomous movement device according to claim 7, wherein upon determination that the estimation result of the local device position estimated using the information on the plurality of images picked up by image picker during execution of the return movement control and stored in the image memory is uniquely defined, the controller ends the return movement control.

9. The autonomous movement device according to claim 1, wherein the controller causes the image picker to pick up the image while performing a rotation action, and controls the drive process so as to move toward a direction in which, among the images picked up by the image picker while the rotation action is performed, the image is picked up having largest information utilizable for the local device position estimation upon determination that the estimation result is not defined uniquely.

10. The autonomous movement device according to claim 9, wherein a rotation angle per a rotation action is an angle equal to or less than a half of a view angle of the image picker.

11. The autonomous movement device according to claim 1, where the image memory stores the information on the image picked up by the image picker every time the autonomous movement device moves by a reference translation distance.

12. The autonomous movement device according to claim 11, wherein a value obtained by multiplying a diameter of a wheel of the driver by a predetermined value is set as the reference translation distance.

13. The autonomous movement device according to claim 11, wherein the controller further extracts, from the plurality of images, a feature point where a position is estimatable, and sets a value obtained by dividing an average value of distances between all of the respective extracted feature points and the local device position by a predetermined value as the reference translation distance.

14. The autonomous movement device according to claim 1, wherein upon determination that the estimation result of the local device position estimated using the information on the plurality of images picked up by image picker during execution of the reverse-direction movement control and stored in the image memory is uniquely defined, the controller ends the reverse-direction movement control.

15. The autonomous movement device according to claim 1, wherein:

in a case in which the reverse-direction movement control is executed using all the amounts of change in position that are recorded in the position change history memory, the controller ends the reverse-direction movement control upon determination that the estimation result of the local device position estimating process executed during the execution of the reverse-direction movement control is uniquely defined, and the controller causes the image picker to pick up the image while performing a rotation action and executes a rotation movement control that controls the drive process to move the autonomous movement device in a direction in which the image picker is oriented at a time point of the picking up of an image that has the greatest amount of information usable for estimation of the local device position among the images picked up by the image picker during the rotation action, and by executing the local device position estimating process during executing of the rotation movement control, estimates the local device position using the information on the plurality of images picked up by the image picker during the execution of the rotation movement control and stored in the image memory.

16. The autonomous movement device according to claim 1, wherein the controller executes the local device position estimating process during the execution of the reverse-direction movement control in a state in which the drive process is controlled to cause the autonomous movement device to autonomously move at a speed lower than a speed of autonomous movement at which the autonomous movement devices autonomously moves in a case in which the controller determines that the estimation result is uniquely defined.

17. An autonomous movement method comprising:

a movement process step of executing a drive process for a driver so as to move autonomously based on information on an image picked up by an image picker;

an image storing step of storing information on a plurality of images picked up by the image picker;

a position estimating step of estimating a local device position in a real-time manner, using the information on the plurality of images stored in the image storing step;

an estimation determining step of determining whether or not an estimation result of the local device position in the position estimation step is uniquely defined;

a recording step of recording, every time the local device position is changed in the movement process step, an amount of change in position in a position change history memory; and upon determination in the estimation determining step that the estimation result is not uniquely defined:

(i) a movement process control step of controlling the drive process in the movement process step so as to move the autonomous movement device in a reverse direction to the amount of change in position recorded in the position change history memory such that the autonomous movement device moves to a position where the estimation result of the local device position in the position estimation step is uniquely defined; and (ii) a movement and estimation step of estimating, by executing the position estimating step in a real-time manner during the movement process control step, the local device position using the information on the plurality of images that are picked up by the image picker during execution of the movement process control step and are stored in the image storing step.

18. A non-transitory recording medium having stored therein a program that causes a computer to execute:

a movement process step of executing a drive process for a driver so as to move autonomously based on information on an image picked up by an image picker;

an image storing step of storing information on a plurality of images picked up by the image picker;

a position estimating step of estimating a local device position in a real-time manner, using the information on the plurality of images stored in the image storing step;

an estimation determining step of determining whether or not an estimation result of the local device position in the position estimation step is uniquely defined:

a recording step of recording, every time the local device position is changed in the movement process step, an amount of change in position in a position change history memory; and upon determination in the estimation determining step that the estimation result is not uniquely defined:

(i) a movement process control step of controlling the drive process in the movement process step so as to move the autonomous movement device in a reverse direction to the amount of change in position recorded in the position change history memory such that the autonomous movement device moves to a position where the estimation result of the local device position in the position estimation step is uniquely defined; and (ii) a movement and estimation step of estimating, by executing the position estimating step in a real-time manner during the movement process control step, the local device position using the information on the plurality of images that are picked up by the image picker during execution of the movement process control step and are stored in the image storing step.

19. An autonomous movement method comprising:

a movement process step of executing a drive process for a driver so as to move autonomously based on information on an image picked up by an image picker;

an image storing step of storing information on a plurality of images picked up by the image picker;

a position estimating step of estimating a local device position in a real-time manner, using the information on the plurality of images stored in the image storing step;

an estimation determining step of determining whether or not an estimation result of the local device position in the position estimation step is uniquely defined;

a position change history recording step of recording, every time the local device position is changed in the movement process step, an amount of change in position in a position change history memory;

a position history recording step of recording, upon determination that the estimation result is uniquely defined in the estimation determining step, information on the position at a time point of the determination that the estimation result is uniquely defined, together with clock time information indicating a clock time at the time point, in a position history memory;

a cumulated position estimating step of estimating a present local device position by cumulating, to the position recorded in the position history memory, the amount of change in position recorded in the position change history memory from the clock time corresponding to the position and up to a present clock time upon determination that the estimation result is not uniquely defined in the estimation determining step; and upon determination in the estimation determining step that the estimation result is not uniquely defined:

(i) a movement process control step of controlling the drive process in the movement process step so as to move the autonomous movement device toward the position recorded in the position history memory from the position estimated in the cumulated position estimating step, such that the autonomous movement device moves to a position where the estimation result of the local device position obtained in the position estimating step is uniquely defined; and (ii) a movement and estimation step of estimating, by executing the position estimating step in a real-time manner during the movement process control step, the local device position using the information on the plurality of images that are picked up by the image picker during execution of the movement process control step and are stored in the image storing step.

20. A non-transitory recording medium having stored therein a program that causes a computer to execute:

a movement process step of executing a drive process for a driver so as to move autonomously based on information on an image picked up by an image picker;

an image storing step of storing information on a plurality of images picked up by the image picker;

a position estimating step of estimating a local device position in a real-time manner, using the information on the plurality of images stored in the image storing step;

an estimation determining step of determining whether or not an estimation result of the local device position in the position estimation step is uniquely defined;

a position change history recording step of recording, every time the local device position is changed in the movement process step, an amount of change in position in a position change history memory;

a position history recording step of recording, upon determination that the estimation result is uniquely defined in the estimation determining step, information on the position at a time point of the determination that the estimation result is uniquely defined, together with clock time information indicating a clock time at the time point, in a position history memory;

a cumulated position estimating step of estimating a present local device position by cumulating, to the position recorded in the position history memory, the amount of change in position recorded in the position change history memory from the clock time corresponding to the position and up to a present clock time upon determination that the estimation result is not uniquely defined in the estimation determining step; and upon determination in the estimation determining step that the estimation result is not uniquely defined:

(i) a movement process control step of controlling the drive process in the movement process step so as to move the autonomous movement device toward the position recorded in the position history memory from the position estimated in the cumulated position estimating step such that the autonomous movement device moves to a position where the estimation result of the local device position obtained in the position estimating step is uniquely defined; and (ii) a movement and estimation step of estimating, by executing the position estimating step in a real-time manner during the movement process control step, the local device position using the information on the plurality of images that are picked up by the image picker during execution of the movement process control step and are stored in the image storing step.

* * * * *